(12) United States Patent
Dikeman

(10) Patent No.: US 10,021,551 B2
(45) Date of Patent: Jul. 10, 2018

(54) CENTRALIZED MANAGEMENT OF DISTRIBUTED SYSTEMS WITH OFF LINE COMPONENTS

(71) Applicant: VIZpin, Inc., Lancaster, PA (US)

(72) Inventor: Peter Dikeman, Cotuit, MA (US)

(73) Assignee: VIZpin, Inc., Lancaster, PA (US)

( * ) Notice: Subject to any disclaimer, the term of this patent is extended or adjusted under 35 U.S.C. 154(b) by 0 days.

(21) Appl. No.: 15/460,856

(22) Filed: Mar. 16, 2017

(65) Prior Publication Data

US 2017/0272897 A1 Sep. 21, 2017

Related U.S. Application Data

(60) Provisional application No. 62/309,514, filed on Mar. 17, 2016.

(51) Int. Cl.
*H04B 7/00* (2006.01)
*H04W 4/80* (2018.01)
*H04L 12/707* (2013.01)
*H04L 29/08* (2006.01)
*H04W 4/00* (2018.01)

(52) U.S. Cl.
CPC .............. *H04W 4/80* (2018.02); *H04L 45/24* (2013.01); *H04L 67/34* (2013.01); *H04W 4/008* (2013.01)

(58) Field of Classification Search
CPC ......... H04W 4/008; H04L 45/24; H04L 67/34
USPC ...................................................... 455/41.2
See application file for complete search history.

(56) References Cited

U.S. PATENT DOCUMENTS

| 5,936,544 | A | 8/1999 | Gonzales et al. | |
| 6,720,861 | B1 | 4/2004 | Rodenbeck et al. | |
| 8,046,721 | B2 | 10/2011 | Chaudhri et al. | |
| 8,222,993 | B2* | 7/2012 | Bliding | E05B 49/00 340/10.1 |
| 8,706,083 | B2 | 4/2014 | Willis | |
| 8,792,826 | B2 | 7/2014 | Willis | |
| 8,873,560 | B2* | 10/2014 | Frusina | H04L 5/003 370/394 |
| 2006/0095582 | A1 | 5/2006 | Nitya et al. | |
| 2008/0299988 | A1* | 12/2008 | Dawson | H04L 67/104 455/456.1 |
| 2010/0043061 | A1 | 2/2010 | Martin et al. | |
| 2011/0205050 | A1 | 8/2011 | Pineau et al. | |
| 2014/0265359 | A1 | 9/2014 | Cheng et al. | |

OTHER PUBLICATIONS

Written Opinion of the International Searching Authority, dated Jun. 12, 2017 in International Application No. PCT/US2017/022742, eight (8) pages.

* cited by examiner

*Primary Examiner* — Sanh Phu
(74) *Attorney, Agent, or Firm* — Iandiorio Teska & Coleman, LLP

(57) ABSTRACT

Featured is a method and system for transferring data to a device. A data set is prepared for a remote device. The data set is divided into subsets based on one or more criteria. The different data subsets are wirelessly delivered from a server to different smart devices based on rules. Each smart device, when proximate the remote device, automatically wirelessly transmits its data subset to the remote device. The remote device then assembles the data subsets.

21 Claims, 21 Drawing Sheets

CENTRALIZED MANAGEMENT OF DISTRIBUTED SYSTEMS WITH OFF LINE COMPONENTS

RELATED APPLICATIONS

This application claims benefit of and priority to U.S. Provisional Application Ser. No. 62/309,514 filed Mar. 17, 2016, under 35 U.S.C. §§ 119, 120, 363, 365, and 37 C.F.R. § 1.55 and § 1.78, which is incorporated herein by this reference.

FIELD OF THE INVENTION

Aspects of the subject invention relate to a system for and methods of updating remote systems that are offline, for example, not connected to a server. In one particular example, the invention relates to the field of security systems.

BACKGROUND OF THE INVENTION

In the field of security systems, an access (e.g., a door) may include a locking device accessed by a key. In advanced security systems, the "key" may be a fob, smart card, or even a cell phone wirelessly accessing the locking device or mechanism which now includes a radio frequency receiver and microprocessor.

In the prior art, it is known to connect via hard wiring all the locking devices of a particular facility to an on premise central access controller. The locking devices are typically "dumb" electro-mechanical devices. The central access controller controls which keys open which locks, controls entry times and dates and from time to time receives software updates typically thru a service call. Examples of software updates include upgrades, new functionality, patches, bug fixes, and changes to configuration parameters such as how long a door is to remain unlocked when a key opens the door.

It is also known to wirelessly connect various locking devices to a central access controller in the form of a server to avoid the need to run wires from each locking device to the central access controller. See for example, U.S. Pat. No. 5,936,544 incorporated herein by this reference. In this case the locking devices involve a microprocessor for wireless communication. Software updates can be delivered wirelessly to the locking device from the central access controller or server.

In some situations, however, it is desirable that the locking device need not be in communication with the central access controller. Examples include locking devices in remote locations without adequate cellular, Wi-Fi, or internet coverage. Also, a battery operated locking mechanism may not be able to provide sufficient power to always maintain a Wi-Fi connection. Examples of such systems include U.S. Pat. Nos. 6,720,861; 8,222,993; 8,792,826; and 8,706,083 all incorporated herein by this reference.

The problem then is how to deliver software updates to the locking devices. A complete software update could be wirelessly delivered from the central access controller to the smart device which is then used to access the locking device. In so doing, the complete software update could be wirelessly delivered from the smart device to the locking device. See U.S. Pat. No. 8,222,993 incorporated herein by this reference. As such, the smart device acts as an intermediary between the central access controller and the locking device.

SUMMARY OF THE INVENTION

Another problem, however, is that the smart device typically is only in wireless communication with the locking device for a short time (for example 5-15 seconds). That is, the user of the smart device approaches the locking device, expects the locking device to open, and then the user walks through the door and into the facility, room, or the like. In that short amount of time, a large software update including many lines of code may not be fully uploaded into the locking device. Moreover, the user's smart device and its resources may be adversely affected by the transaction, causing sluggish response, consuming battery power and depleting the user's data plan. And, in remote areas, the smart device may not be in reliable communication with the central access controller.

Accordingly, a service call must be made to each locking device to deliver a software update resulting in a significant expense and a possible delay in providing up-to-date software updates to the locking devices.

In one aspect of the invention, software updates are provided to remote devices such as locking devices in a new way. Preferably, the smart device users do not need to alter their behavior with respect to remote component interaction. There is minimal impact on the user's smart device and its resources. In one particular example, the invention features a method of and a system for updating the software of a locking device.

Featured is a method of transferring data to a remote device. A preferred method comprises preparing a data set for the remote device, automatically dividing the data set into subsets based on one or more criteria, and automatically wirelessly delivering the different data subsets from a server to different smart devices based on rule. Each smart device, when proximate the remote device, automatically wirelessly transmits its data subset to the remote device and the remote device assembles the data subsets.

The data set may be a software update applied by the remote device. Typically, the remote device is a locking device. An example of a rule includes wirelessly delivering one said subset to two or more smart devices for redundancy. An example of a criteria includes the upload time required to wirelessly deliver a subset from the smart device to the locking device and the size of the data subset. The upload time may be based on the average time a smart device is proximate the locking device. Another criteria may be based on tracking when a smart device is proximate the remote device.

In some examples, each smart device communicates with the remote device wirelessly via a Bluetooth connection. Preferably, the smart devices receive their data subsets when networked with the server and transmit their data subsets to the remote device when not networked with the server. The data subsets may be encrypted by the server. The method may further include a procedure where the remote device sends a message to the smart device, the smart device transmits said message to the server, and the server acts on said message to change a rule.

Also featured is a method of indirectly transferring a data set to a remote device. The method comprises preparing a data set for a remote device, dividing the data set into subsets, assigning each subset to one or more device queues for wireless delivery from a server to different smart devices configured to wirelessly communicate with the remote device when proximate the remote device, each smart device, when proximate the remote device, automatically wirelessly transmitting its data subset to the remote device, and the remote device assembling the data subsets into the original data set.

One method of indirectly transferring a data set to a remote device includes preparing a data set for a remote device, dividing the data set into dynamic subsets, and assigning each subset to one or more device queues for wireless delivery from a server to different smart devices configured to wirelessly communicate with the remote device when proximate the remote device. Each smart device, when proximate the remote device, automatically wirelessly transmits a data subset to the remote device. The remote device confirms to the server the receipt of the data subset, and the server, upon receiving the confirmation, dynamically removes the data subset from all device queues if still present in the queue. The remote device assembles received data subsets into the data set regardless of the order in which the data subsets were received and disregarding subsets which were delivered redundantly.

Also featured is a system for transferring data to a device. A server is configured to prepare a data set for a remote device, to divide the data set into subsets based on one or more criteria, and to wirelessly deliver the different data subsets to different smart devices based on rules. Each smart device, when proximate the remote device is configured to automatically wirelessly transmit its data subset to the remote device. The remote device is configured to assemble the data subsets.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
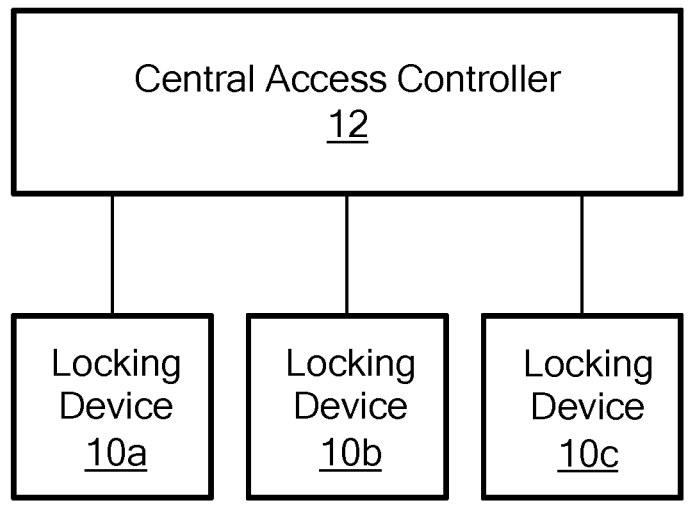
FIG. 1 is a schematic view of a prior art security system where the individual locking devices are hard wired to the central access controller.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

In the prior art, it is known to connect via hard wiring all the locking devices 10a, 10b, and 10c, FIG. 1 of a particular facility to a central access controller 12.

Figure 2:
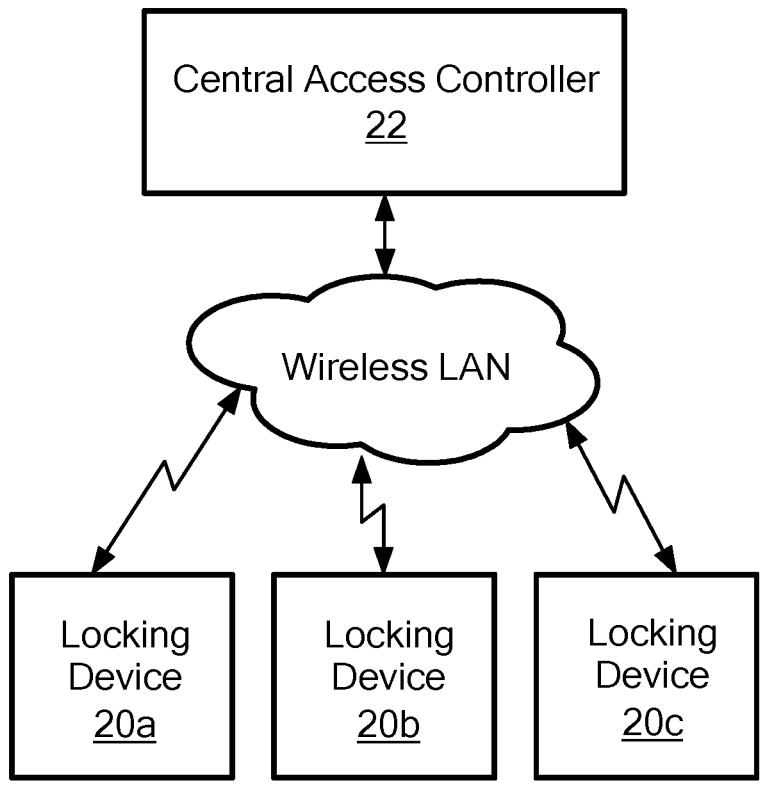
FIG. 2 is a block diagram showing the primary components associated with another prior art system where the locking devices interface with the central access controller wirelessly, for example, via WiFi.

It is also known to wirelessly connect various locking devices 20a, 20b, and 20c, FIG. 2 to a central access controller now 22 in the form of a server to avoid the need to run wires from each locking device to the central access controller. Software updates can be delivered wirelessly to the locking devices 20 from the central access controller or server 22.

Figure 3:
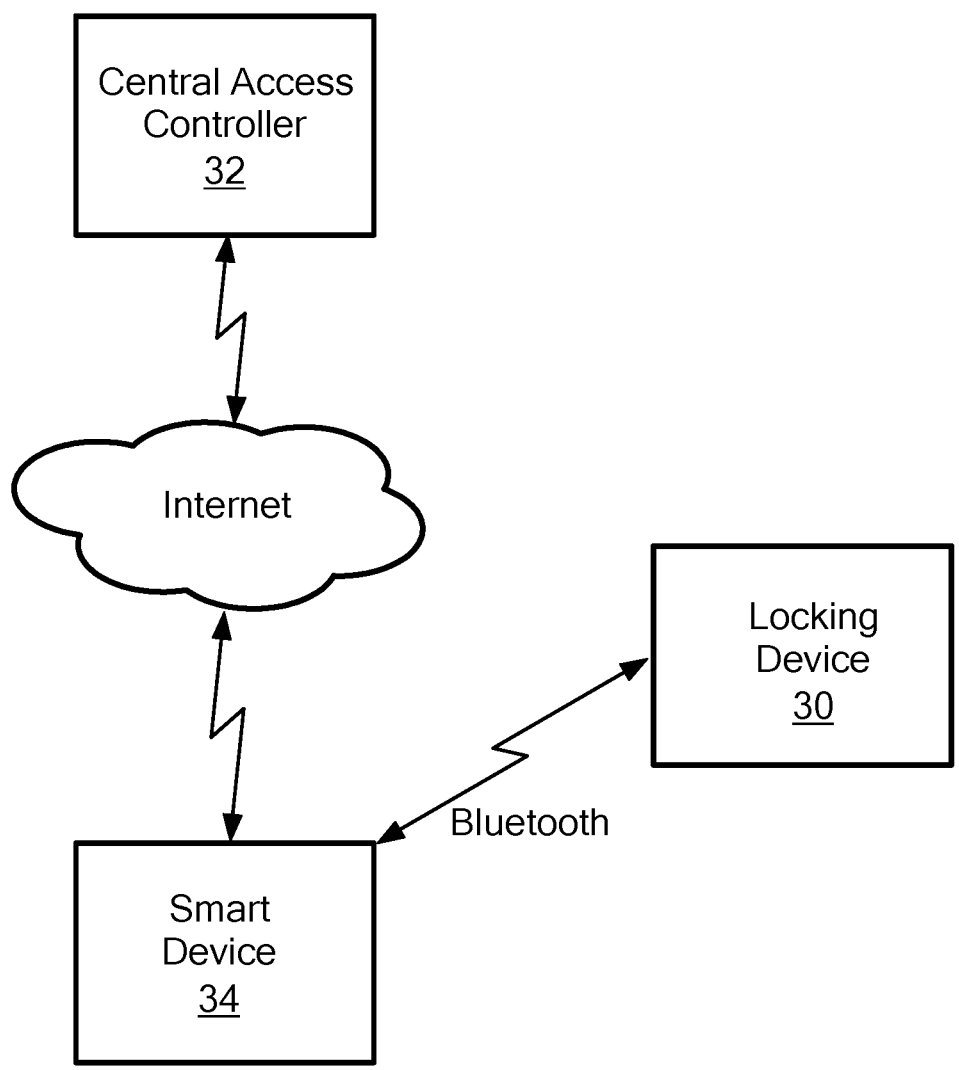
FIG. 3 is a schematic block diagram of an example of the invention showing the primary components associated with a security system wherein the locking devices are unable to communicate wirelessly with the central access controller.

In some situations, however, it is desirable that locking device 30, FIG. 3 need not be in communication with the central access controller 32 e.g., a server. Examples include locking mechanisms in remote locations without adequate cellular, Wi-Fi, or internet coverage. Also, a battery operated locking mechanism may not be able to provide sufficient power to always maintain a Wi-Fi connection. Here, a smart device 34 is in communication, when able, with controller or server 32 and smart device 34 may then when able, and possibly later and at a different location, communicate with locking device 30 via, for example, Bluetooth communications as described in U.S. Pat. Nos. 8,792,826 and 8,706,083 incorporated herein by this reference. Locking device 30 may also communicate with smart device 34 to upload a message to smart device 34 which then uploads said message to controller 32 when able via, for example, a network.

Figure 4:
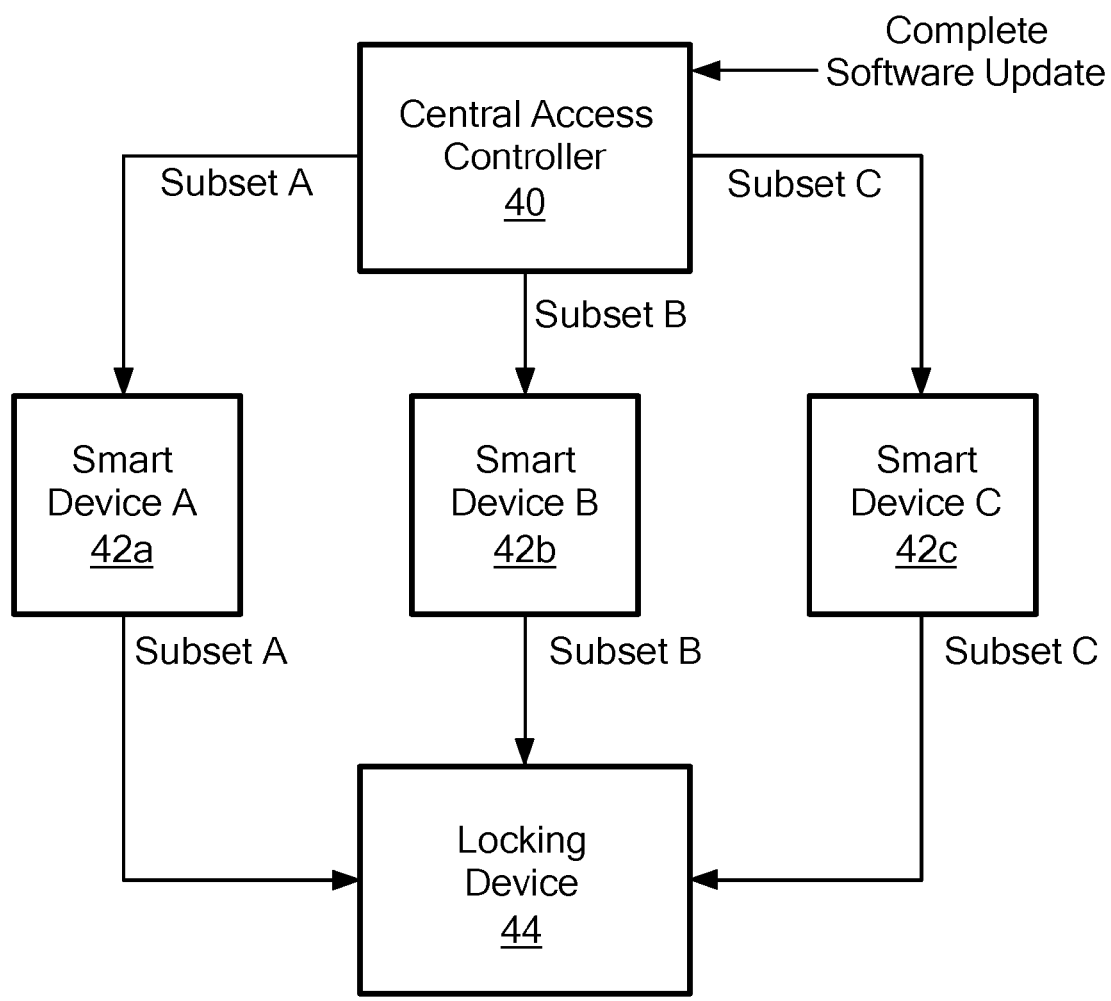
FIG. 4 is a block diagram showing one method of updating the software of locking device in accordance with the subject invention.

One problem is how to deliver software updates to the locking devices which may not be reliably in communication with a server. As shown in FIG. 4, according to one exemplary method of updating the software of a locking device, central access controller (e.g., server) 40 is configured to prepare a software update for a locking device and to automatically divide the software update into subsets based on certain criteria as shown in FIG. 4 to include n separate subsets of the complete software update, here subsets A, B, and C, which are then wirelessly delivered by the central access controller to different smart devices accordingly to various rules as shown where smart device 42a receives subset A of the complete software update, smart device 42b receives subset B of the complete software update, and smart device 42c receives subset C of the complete software update. Typically, there will be many more smart devices and many subsets of the update. The smart devices preferably pull data from the server whenever they are in network coverage and delivery of data to a smart device is confirmed at the server.

The smart devices are configured to communicate wirelessly with the locking device 44 when proximate the locking device typically, but not necessarily in order to unlock the locking device and access one or more controlled access locations. Each smart device 42a, 42b, and 42c is configured to automatically wirelessly transmit its subset of the software update to the locking device as shown. Preferably as each subset is received, the locking device confirms receipt to the server by transmitting a confirmation message to the smart device which then transmits that confirmation message to the server. Locking device 44 then assembles the various subsets of the complete software update when all the subsets of the software update have been received and the software update is complete. The locking device then applies the software update. In the same way, other locking devices receive the software update. The locking device also preferably confirms that the entire data set from the server has been received and this confirmation is transmitted from the smart device to the server 40. Similarly when locking device 44 successfully applies the software update, a confirmation is uploaded to a smart device in Bluetooth range of the locking device and this confirmation is uploaded by the smart device to the server when in network coverage with the server. Such messages received by the server enable it to change the rules set for delivering additional data subsets to the smart devices. Also, if a locking device encounters an error in receiving data from a smart device and/or in applying the code delivered to it from one or more smart devices, an error message is generated by the locking device and uploaded to a smart device which then uploads the error message to the service which can then take the appropriate corrective action such as re-queuing the data for one or more smart devices which again delivers the data to the locking device when in Bluetooth range. Thus, the server delivers data pursuant to various rules which change based on messages received by the server.

This method may be used to deliver a data set other than a software update to locking device 44, FIG. 4. For example, the data set could be new encryption keys which determine the validity of transactions such as the delivery of access keys that authorize unlocking of locking device 44 when a smart device is proximate locking device and transmits to it the new key code. The encryption key transmission requires a process for the server and the locking device to agree on when the encryption key will become effective (soft sync). Also, device 44 could be a remote device having a Bluetooth transceiver, a processor, and memory including, for example, an automatic door opener, other access devices, or other remote devices.

The subject methods and systems are particularly applicable to many situations where a real time internet connection is either physically impossible, uneconomical or not prudent because of network security concerns. This security concern is especially true in a commercial as opposed to residential environment. Examples include physically remote areas where there is no network coverage other than perhaps by very expensive satellite link. Also, even within major metropolitan areas there are places in large buildings without network coverage. If there are only a few devices in a building, their location may require installing one bridge per device which would not be economically feasible. And, even in the case where it is economical to install network bridges to service devices, the connection of these devices and bridges to a company's network infrastructure could pose some serious security concerns.

Consider the example system of a distributed system with a plurality of remote devices that are offline i.e. not directly connected to server. In this example there are three primary components. The server (or servers) 40, FIG. 4 that provide services to a plurality of intermediate smart devices 42 and indirectly thru the intermediate smart devices 42 to remote devices 44. The plurality of intermediate devices 42 (e.g., smart devices, smart phones, tablets, laptops etc.) are sometimes connected to the server through a network (e.g., Wi-Fi, Cellular data network etc). The services provide by the server allow said intermediate devices to in turn be enabled to receive services from remote device components of the system. The plurality of remote devices typically have low power wireless capability (e.g., Bluetooth) that is compatible with the low power wireless capability of the smart devices. Typically the range of this low power technology is 10-20 meters.

In one example, system managers interact directly and indirectly with the server and remote devices to maintain and upgrade the system. As pointed out previously, in many cases, it is not economically feasible, or it is physically impossible, to provide a reliable, direct real time connection between the server and the remote devices.

In such cases the system managers may resort to indirect methods of communication to maintain these remote devices. Examples of maintenance activities include setting configuration parameters, retrieving data about the activity or "health" of the remote device, and/or updating programs controlling said remote devices.

To date, the most common alternative was to send trained personnel to each device to service them, a technique euphemistically called "sneaker net". This is expensive to do and consequently remote devices that are "offline" from the server are infrequently serviced, sometimes they are serviced only when they fail. This in turn negatively impacts the capabilities of the system and its ability to adapt over time to improve the quality and scope of services that it provides. To do a system upgrade often means replacing these remote devices.

Another possible alternative is to use smart devices to act as a network bridge and relay information in real time between the server and remote devices. However this does not work when remote devices are in areas of unreliable cell coverage. Examples of unreliable cell coverage are geographically remote areas and also areas within a building even when they are located in areas of normally good cell coverage. Within those building there are often Wi-Fi services, but due to security policies or spotty coverage these may not be available to a user smart device.

Even in areas of good connectivity the user may not wish to have his smart device act as a relay for large quantities of data that may adversely impact the user's smart device and it's resources. Furthermore they will generally not be amenable to altering their behavior to facilitate the transfer of data between the remote device and the phone. For example, staying within the range of low power wireless (e.g. Bluetooth) signals of the remote device while the data is being transmitted.

The subject invention overcomes these problems allowing seamless management of one or more remote devices utilizing one or more user smart devices through the use of a unique method of distributing the data.

If it is selected to participate as an intermediate device, each user smart device is only used for passing along a small portion of the data if and when they happen to come in range of a remote device that needs that data. Consequently there is no significant impact on the smart device or its resources and no requirement for the user to alter their behavior. According to one rule, subsets of the complete set of transaction data may be redundantly distributed to selected smart devices and buffered so that many smart devices will contain the data required by the remote device. This rule increases the chances that a smart device within wireless range of a remote device will contain the data required by said remote device. Buffering the data allows the smart device to transmit the data to the remote device even when the smart device has no available connection to the server.

This approach means that the time to complete a transaction is indeterminate. However, in many cases, this is acceptable to the alternative of a service call by trained personnel. If the circumstances require it, this issue can be mitigated by criteria including an appropriate choice of the devices to be used, as well as the size, redundancy and frequency of the subset of transaction data sent to each selected smart device. For example the entire set of data could be transmitted to the smart device of an on site person acting as a proxy for a service person.

The criteria algorithm for choosing the devices and the size, redundancy and frequency of the subset can be selected to trade off the time required to complete the transaction against the cost of transmission. In an extreme example, all transaction data may be sent to every smart device to guarantee the fastest delivery. At the other extreme, there may be almost no data redundancy because we can reasonably predict that all user smart devices will come within range of the targeted remote devices in the required time period. An example of this last scenario is a remote device that controls the lock on the employee entrance to a business. One can reasonably predict that within a short period of time at the start of the business day that all most all users (and their smart devices) will pass within range of the locking device. Hence only minimal data redundancy is required to ensure a timely transaction. If the server keeps a history of user interaction with remote devices then these usage patterns can be used to optimize selection of devices as well as cost time to complete a transaction.

An analogous approach can be used to upload data from a remote device to the server. In this case, the algorithm for choosing a subset of data is greatly simplified because the transaction target is limited to the server and the server can be easily accessed by a smart device as soon as it is in network coverage. In most cases it can be reasonably assumed that a high percentage of user smart devices will return to network coverage in a relatively short period of time. A full duplex scenario is also possible where remote devices can concurrently be both sending and receiving transactions from the server.

The best scenario occurs when a smart device is in contact with the server and also the remote device at the same time. Even when the connection to either device is of poor quality the transaction may be completed.

By incorporating a transaction identifier in the transaction data subset, it is possible to have multiple inbound or outbound concurrent transactions from a remote device. For example, a small change in configuration parameters may be done while a very large transaction of doing a firmware update is being conducted.

By encrypting data at the server with a key known only to the server and remote device and providing a decryption and data integrity checking mechanism at the remote device, the smart device becomes merely a conduit for data transmission between the server and the remote device. Since the smart device plays no role in data security or integrity, there is minimal opportunity for a hacker to gain control of a remote device.

Additionally there is often a need to provide a synchronized change in behavior at both the server and the remote device after a transaction. A simple example might involve changing a key used to encrypt data within the system. After the key is received at the remote device, said device can initiate a small transaction targeting the server notifying said server that the key has been received. The server can then begin to use the new encryption key with the next transaction sent to that target remote device. However there may be some target bound and/or server bound transactions that were previously buffered in an intermediate smart device that used the previous encryption key. If necessary, server bound transactions can be invalidated by the server and resent by the target without inconvenience to the user of the intermediate smart device. However invalidating the target bound transactions could pose an inconvenience to the user. In the example of the access control system these transactions might be the access keys the user needs. If the locking device is in an area of no network coverage there may be no easy way for the user to refresh the keys from the server. Rather than invalidate all these target bound transactions the server and the target would, for some previously agreed upon grace period, accept transactions with either encryption key before making a final switch to accepting only the new encryption key.

In one embodiment, the invention allows a distributed system to transfer data between devices with the transfer having the following characteristics. Remote device does not need to be located in any area of network coverage. An intermediate device (smart device) only needs to be in intermittent contact with the server and remote device. The period of contact with server and remote device does not need to overlap and can be as short as a fraction of a second. There is typically no need for intermediate smart device users to alter their behavior with respect to remote device interaction nor do they need to be in anyway involved.

There is preferably minimal impact on user's smart device and its resources e.g. data communication charges, battery and CPU cycles. Also, either the server or the remote devices can initiate a transaction. The method preferably includes the ability to tradeoff between timeliness and efficiency of transactions between server and remote devices and to synchronize behavior changes between system components. The intermediary user smart device plays no role in ensuring data integrity and security. Multiple concurrent transactions can be handled between server and remote devices. Transactions can be targeted at all or any subset of remote devices using any subset of available smart devices.

The concept can be extended beyond one level of indirection—target remote device can itself be an intermediary for its wireless peripherals. In the case of an access control system, an example of such a peripheral is a Fob used to activate a locking device. This allows the server to configure or update the Fob using both the smart device and the locking device as intermediaries.

Figure 5:
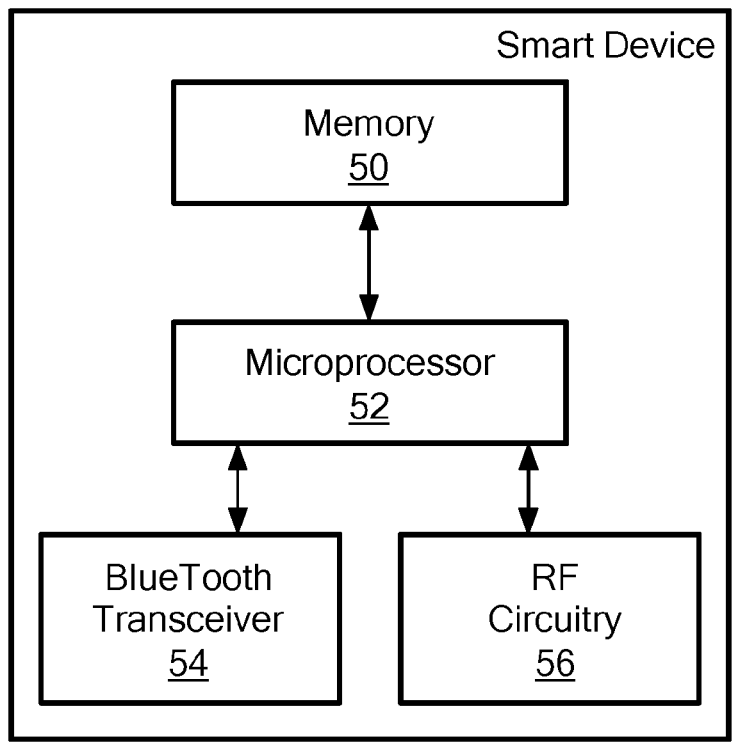
FIG. 5 is a block diagram showing the primary components associated with a smart device in one example of the invention.

FIG. 5 shows several of the primary components associated with a typical smart device. See U.S. Pat. No. 8,046,721 incorporated herein by this reference. There is a memory 50 for storing data (e.g., a software update subset) delivered to the smart device from a server. There is a microprocessor 52, microcontroller, application specific integrated circuit, field programmable gate array, or other processing means accessing memory 50 and typically Bluetooth transceiver 54 for communicating with a remote (e.g., locking) device via the Bluetooth protocol and also RF circuitry 56 for wirelessly communicating with a central access controller (e.g., a server) using Wi-Fi technology, cellular telephone technology, and/or the like. Typically, the smart device communicates with a central access controller via one or more cell towers and the internet. In this way, as an example, processor 52 receives a software update subset from RF circuitry 56 and stores it in memory 50. Processor 52 is also configured to retrieve a software update subset from memory 50 and deliver it to locking mechanism via Bluetooth transceiver 54. Similarly, processor 52 can store in memory 50 data received from a remote device and transmit that stored data to the server.

Figure 6:
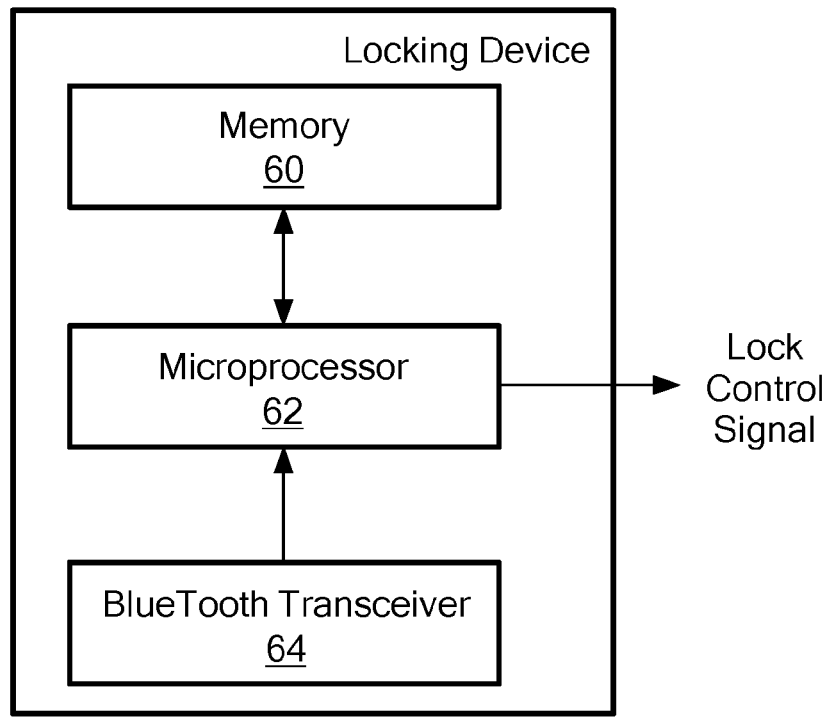
FIG. 6 is a block diagram showing the primary components associated with a locking device in accordance with an example of the invention.

One example of a locking device is shown in FIG. 6 where the locking device also includes a memory 60, a microprocessor 62 or similar, and a Bluetooth transceiver 64 for communicating with the smart device of FIG. 5. The microprocessor or microcontroller 62 is typically configured to output a control signal as shown to either lock or unlock or open a door or other access point. One example of a locking device is shown in U.S. Pat. No. 8,222,993 incorporated herein by this reference. Processor 62 is configured to store in memory 60 a software update subset received via Bluetooth transceiver 64 from a smart device. Processor 62 is further configured to apply a complete software update after assembling the various subsets. Processor 62 is further configured to retrieve data from memory 60 data and to control transceiver 64 to transmit said data to a smart device.

Improved computer functionality includes the use of programmed criteria and rules. The server or central access controller, FIG. 4, may, for example, be configured to automatically deliver one subset of the complete software update to two or more smart devices for redundancy as a rule. But, that rule is changed when the server receives confirmation that a target remote device has successfully received that subset.

Dynamic management of device queues on the server can minimize unnecessarily redundant transmission of subsets from server to smart device and target remote device, by removing subsets reported as "received" by the target as a rule.

Target remote devices can receive subsets in any order. A non-sequential and different ordering of each of the smart device queues can improve efficiency when redundantly sending subsets because you are unlikely to have two smart devices trying to deliver the same subset to a target at any given time. Any algorithm that depended upon receiving subset in order would be much slower as you would then need to get the remote target device to confirm receipt of a subset before queuing the next one.

The size of each subset of the complete software update may be determined automatically by the server based on the typical upload time required to wirelessly deliver a given subset of the complete software update from the smart device to a locking device. For example, if the average smart device is in Bluetooth communication with a locking device for between five and ten seconds, then an algorithm operating on the computer platform of central access controller 40 may determine that only X lines of code can be wirelessly delivered via Bluetooth in that amount of time and thus the algorithm, according to this criteria, automatically divides the complete software update into subsets each no longer than the number of lines of code so determined. Typically, the server can determine when a smart device is likely to be in Bluetooth communication with a locking device and/or the smart device can report such information to the server.

Also, central access controller 40 is typically in communication with a given smart device via the internet from time to time and is thus able to track when a given smart device is proximate a particular locking device. Accordingly, the algorithm of the central access controller can be configured to automatically choose particular smart devices to receive particular subsets of a complete software update based on which smart devices are most likely to be proximate at an appropriate time with a given locking device as a criteria. Suppose, for example, in FIG. 4 smart device 42*a* is proximate and establishes a Bluetooth communication link with locking device 44 every morning during the week while smart devices 42*b* and 42*c* only periodically establish a wireless Bluetooth communication link with locking device 44. Using this criteria, central access controller may provide more subsets of the complete software update to smart device 42*a* than smart devices 42*b* and 42*c* or provide different subsets more often whenever central access controller 40 is in wireless communication with smart device 42*a*. Using other criteria, central access controller 40 is configured to only deliver subsets of a given software update to those smart devices which are regularly in contact with a particular locking device. Typically, a software update is targeted to a particular locking device and, when a smart device is in wireless communication with the central access controller, the central access controller is able to determine whether a given smart device has uploaded its software update subset to a given locking device and is thus ready to receive another subset of a given software update. Typically, the smart devices receive their software updates subsets when networked with the central access controller 40 and transmit their subsets of the software update to remote devices when not networked with the central access controller. The software update subsets may be encrypted.

Figure 7:
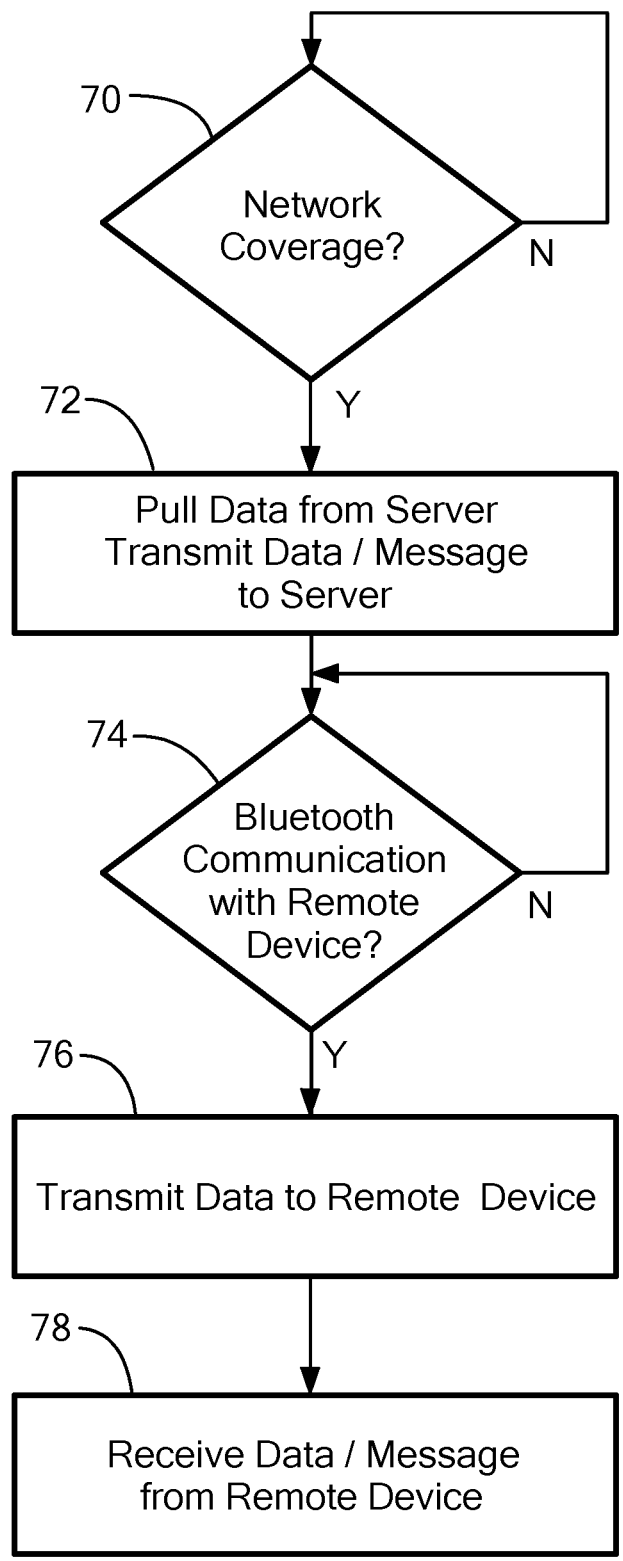
FIG. 7 is a flow chart depicting how a smart device pulls data subsets from the server, transmits the data subsets to a remote device, and transmits server messages received from the smart device to the server. Note that there are two separate concurrent threads of execution.

As shown in FIG. 7, when the smart device has established network coverage with the server, step 70 the smart device pulls data from the server (e.g., a software update subset) and may transmit a server message to the server (e.g., a report from a remote device of a successful complete upload of a software update), step 72.

Figure 8:
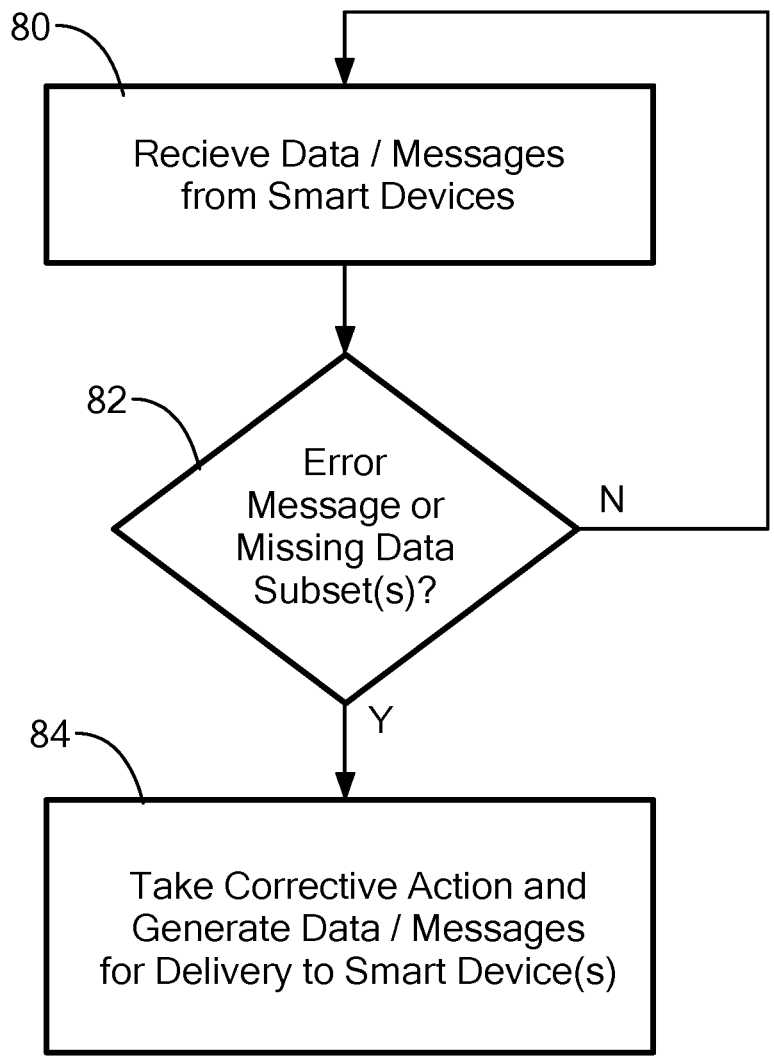
FIG. 8 is a flow chart depicting how the server acts on server messages received from a smart device.

Regardless of whether or not a smart device currently has network coverage, when the smart device has established a Bluetooth connection with the remote device, step 74, the smart device transmits any data received in step 72 to the remote device (e.g., a software update subset), step 76. The smart device may then receive data and/or a message from the remote device (e.g., a message confirming that the remote device successfully received the software update subset), step 78. At a later time when in network coverage (step 72), this message may be sent from the smart device to the server which then logs the successful upload to the remote device. If a message received by the server from a given smart device at step 80, FIG. 8 indicates an error message or if the server determines that a given remote device is missing one or more data subsets, step 82, the server takes corrective action as shown in step 84 (e.g., according to a rule wherein the missing data subset is forwarded to one or more smart devices predicted to be in Bluetooth communication with the remote device). Upon confirmation that a data subset has been successfully delivered to the remote device, the server is configured via a rule to remove that confirmed data subset from its smart device queue of data subsets for that specific remote device.

The remote device typically doesn't care what order the subsets arrive so having the server queues that hold subsets to be sent to smart devices arranged in non-sequential order and different from one another as a rule could substantially improve efficiency if subsets are assigned redundantly to more than one device as a result of favoring timely delivery over cost.

"Dynamic" subset assignment to smart devices queues means "removing" subsets the target has confirmed receiving from the server from said queues. These now redundant subsets for a specific target are effectively removed by deassigning that subset from delivery to the remote target device in all active smart device queues. If the subset no longer has any remote targets assigned delivery, the subset is removed from all the active smart device queues.

The concept can be extended to another level of indirection . . . i.e., the remote device could pass info on to another device that might not be in the vicinity when the smart device is proximate. The access control example is a Fob for use as a "key" in the event you don't have a smart phone.

The system can also handle concurrent transactions—e.g. in the middle of a long firmware update that could take several days we can complete a small configuration update even though the firmware update has not been concluded.

The system can "soft" synchronize server-target changes for things that depend on both sides being in agreement. An example is changing encryption keys while dealing with the non-deterministic timing inherent when dealing with an "offline" device.

In summary, this invention allows a distributed system to transfer data between devices with the transfer having one or more of the following preferred characteristics:

- A bidirectional, indirect transfer between a server and one or more remote devices utilizing intermediate devices such as smart devices.
- The concept can be extended beyond 1 level of indirection—the remote device can act as an additional intermediary for its wireless peripherals.
- The remote device does not need to be located in any area of network coverage.
- The intermediate device (smart device) only needs to be in intermittent contact with the server and remote device. The period of contact with server and remote device does not need to overlap. The periods of contact can be as short as a fraction of a second.
- No requirement for intermediate smart device users to alter their behavior with respect to remote device interaction.
- Minimal impact on user's smart device and its resources.
- Either the server or the remote devices can initiate a transaction.
- The ability to tradeoff between timeliness and efficiency of transactions between server and remote devices.
- Synchronizing behavior changes between system components
- The intermediary user smart device plays no role in ensuring data integrity and security, the smart device does not need to be authenticated by the remote device and does not need to be authorized by the server to deliver subset data.
- Handles multiple concurrent transactions between server and remote devices.
- Transactions can be targeted at all or any subset of remote devices using any subset of available smart devices.
- Dynamic management of smart device queues on the server can minimize unnecessarily redundant transmission of subsets from server to smart device and from smart device to remote device, by removing subsets reported as "received" by the remote device.
- Remote devices can receive subsets in any order. A non-sequential and different ordering of each of the device queues can improve efficiency when redundantly sending subsets because it lessens the chance that two or more smart devices will redundantly deliver the same subset.

The Centralized Management System is preferably comprised of three primary components: a Server, one or more intermediate smart devices (Devices) and one or more remote target devices (Targets).

The Server contains a central repository of data related to managing Targets.

The Server manages the overall process of transferring data bi-directionally and indirectly thru one or more intermediate Devices to one or more Targets. The transfer of data to the Devices is typically accomplished through a network infrastructure. Transfer of data from the Device to Targets is typically accomplished with a short range wireless technology such as Bluetooth.

The Device is typically a smart device such as a smart phone, a laptop or a tablet. Devices are used to relay information between a Server and a Target. The Target is a piece of equipment that is the consumer of Data Sets sent by the Server and the most common source of Server Messages. Typically they are offline, in areas of unreliable, inconsistent network coverage or unable to support a network connection. The complexity of the Target can range from very simple to very complex.

A collection of data to be delivered to one or more Targets via a Device is referred to as a DataSet. The transaction to deliver the same DataSet concurrently to one or more Targets is referred to as a DataSet Transfer.

The entity initiating the DataSetTransfer is referred to as the Initiator. DataSets are delivered to Targets via Devices in one or more pieces contained in packages referred to as Subsets. Each Subset contains a unique part of the DataSet. Subsets need not be unique to a Target i.e. One Subset can be addressed/delivered to multiple Targets. A Subset contains both data and control information. Control information might include items such as a Subset ID, Subset Sequence Number and an "address" list of one or more TargetID/SessionID pairs that enable the delivery of a Subset to multiple targets with only a single copy of the Subset being created. A transaction to deliver a DataSet to a specific Target is referred to as a Session. Sessions have unique Identifiers called SessionIDs. They contain various data structures that control the Session. Sessions are unique to a Target. Data received by the Server from a Device or a Target is delivered in a package called a ServerMsg. The ServerMsg contains both data and control information.

Error handling and other details unimportant to the concepts presented are omitted for clarity. The methods and procedure to handle these errors and details are well known to those practiced in the art.

The Following Procedures and Data Structures May be Used:

Server: TransferDataSet Procedure

Summary:

This is the overall process for transferring a DataSet To one or more Targets (Transfer). It starts the DeviceConnEvt Thread and starts the Transfer. It then waits for Transfer to be done. When the Transfer is done it stops the DeviceConnEvt Thread, analyzes performance data and then generates a report.

Figure 9:
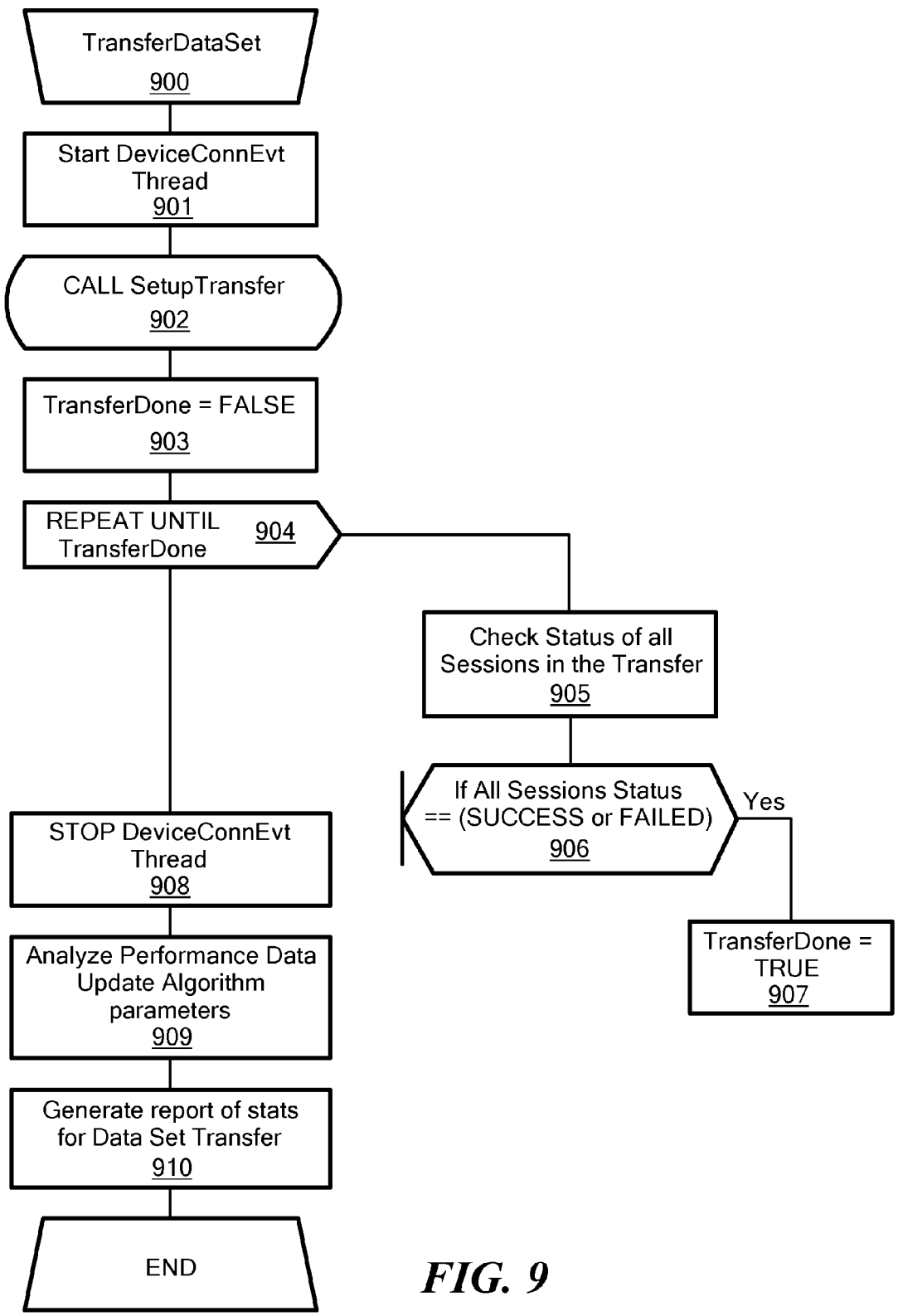
FIGS. 9-19 are flow charts depicting the primary steps associated with a preferred version of the programming associated with a method of transferring data in accordance with the invention.

Psuedo Code:
(Refer to flow chart FIG. 9)

```
BEGIN TransferDataSet
   START DeviceConnEvt Thread
   CALL SetupTransfer
   TransferDone = FALSE
   REPEAT UNTIL TransferDone
      Check Status of all Sessions in the Transfer
      IF All Sessions Status == (SUCCESS or FAILED)
         TransferDone = TRUE
      ENDIF
   ENDREPEAT
   STOP DeviceConnEvt Thread
   Analyze Performance Data. Update Algorithm parameters
   Generate report of stats for Data Set Transfer
END
```

Discussion:

The DeviceConnEvt Thread is started and waits for a connection from a Device (901). This thread services the Device by getting any ServerMsgs it has buffered from Targets, processing those messages and sending appropriate Subsets back to the Device for eventual forwarding to Targets when the Device is proximate said individual Targets.

Given parameters selected by an operator OR provided by another system procedure the SetupTransfer (902) divides the DataSet into Subsets using the parameters provided, and assigns those Subsets to Devices based on provided parameters and Device Score relative to each Target. It initializes a Session structure for each Target to monitor status of the DataSet Transfer to the Target as well as various other data structures used to start and manage the DataSet Transfer to the selected Targets, it then starts the DataSet Transfer. The TransferDone flag is set to false (903)

The status of the DataSet Transfer is monitored by repeatedly checking the status of all Sessions (904,905). When all Sessions have completed (SUCCESS OR FAILED) the DataSet Transfer Is done (906) and TransferDone is set to TRUE (907). The DeviceConnEvt is stopped (908) and the performance data for DataSet Transfer is analyzed and distilled for use in optimizing system algorithms to enhance the efficiency of future DataSet Transfers (909). Finally, a report is generated for the system operator with the basic statistics for the DataSet Transfer such as start/end times for the transfer as well as each Session, errors, amount of data transferred versus DataSet size, etc (910).

Server: SetupTransfer Procedure

Inputs: Data Set Selection, Target selection and Costvs-TimePriority from Initiator Outputs: A DataSetTransfer with all underlying data structures.initialized. Estimate provided to Initiator for Cost and Time to deliver DataSet.

Summary:

SetupTransfer sets up a DataSet Transfer to one or more Targets. It can be initiated by either a user or by another system component—for example a scheduler can provide appropriate inputs to the SetupTransfer procedure.

Figure 10:
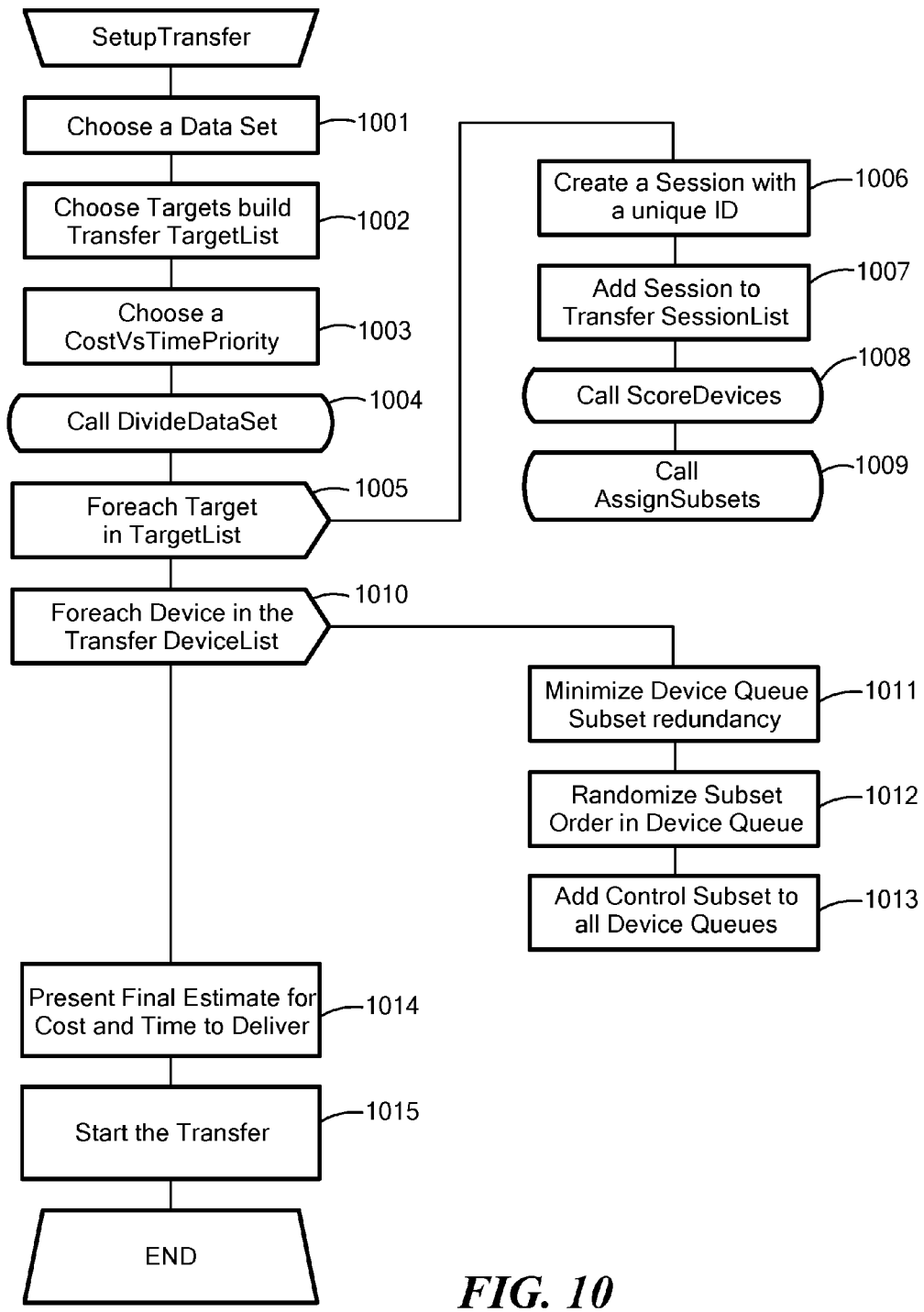

SetupTransfer divides the DataSet into Subsets using the parameters provided by Initiator, and assigns those Subsets to Devices based on provided parameters and Device Scores relative to each Target. It initializes a Session structure for each Target to monitor status of the DataSet Transfer to the Target as well as various other data structures used to start and manage the DataSet Transfer to the selected Targets, It then starts the DataSet Transfer Psuedo Code:
(Refer to flow chart FIG. 10)

```
BEGIN SetupDataTransfer
   Choose a DataSet
   Choose Targets, build Transfer TargetList
   Choose a CostVsTimePriority
   Call DivideDataSet
   Foreach Target in TargetList
      Create a Session with a unique ID
      Add Session to Transfer SessionList
      Call ScoreDevices
      Call AssignSubsets
   EndForeach
   foreach Device in the Transfer DeviceList
      Minimize Device Queue Subset redundancy
      Randomize Subset Order in Device Queue
      Add Control Subset to all Device Queues
   EndForeach
   Present Final Estimate for Cost and Time to Deliver
   Start the Transfer
END
```

Discussion:

The initiator chooses a DataSet to be transferred (1001). Typically this will be a file created by other parts of the system. The data may anything that can be processed by the Target.

The initiator chooses the Targets that will receive the DataSet by selecting Target from a list of all Targets known to the system. Targets are added to the Transfer TargetList. (1002)

The initiator chooses a CostVsTimePriority (1003). The CostVsTime priority can be expressed as a sliding scale e.g. a value of 1 might indicate Cost is the highest priority and a value of 5 might indicate Time is the highest priority while a value of 3 would indicate a balanced priority. The problem is the Initiator may have little feeling for the impact of the adjustment for a given Session. For example with a moderate size DataSet and a small number of Targets, the difference in absolute cost for the Session between choosing a priority of 1 versus 5 may be totally inconsequential, but there could be a noticeable impact on delivery time.

This CostVsTimePriority can be established in a number of ways. For example—The initiator specifies a time window for completion of delivery and the system calculates an initial estimated cost. Another approach is to specify a cost and calculate an initial estimated delivery time window. In both cases using results from previous similar Transfers may be helpful in preparing the initial estimate. In either case, the initiator would approve or reject the initial estimate. If he rejects the proposal then the process is repeated until a proposed cost and delivery time is accepted. A final more accurate estimate is prepared after all Subsets are defined.

The details for arriving at a CostVsTimePriority acceptable to the initiator are not important and many implementations are possible.

Create the Transfer SubsetList by dividing the DataSet into Subsets of a "best size" using the DivideDataSet procedure (1004).

For each Target in the TargetList (1005):

a. Create a Session with a unique Session Id as well as the underlying required data structures (1006), add the Session to the Transfer SessionList (1007).

b. Using the ScoreDevices procedure to create a DeviceScoreList relative to this Target (1008).

c. Using the AssignSubsets procedure and the DeviceScoreList, do an initial assignment of the Subsets to the Queues of one or more Devices. Update Session data accordingly (1009).

For each Device in the Transfer DeviceList (created by examining Session DeviceLists) (1010):
  a. Minimize any redundancy of Subsets in the Device Queue (1011). As a result of the AssignSubsets procedure the same Subset may have been placed in a single Device Queue more than once.
  b. Randomize Subset order in Device Queue (1012). We do this to minimize the chance that two different Devices will attempt to deliver the same Subset to a Target at about the same time.
  c. Add a Control Subset with Session Info to the Device Queue (1013). This information is necessary for the Target to complete a Session and verify its integrity.

Present the final estimate for Cost and Time to Deliver to the initiator. (1014)

Start the Transfer (1015) by setting the DataSetTransfer Active Flag to TRUE.

Figure 11:
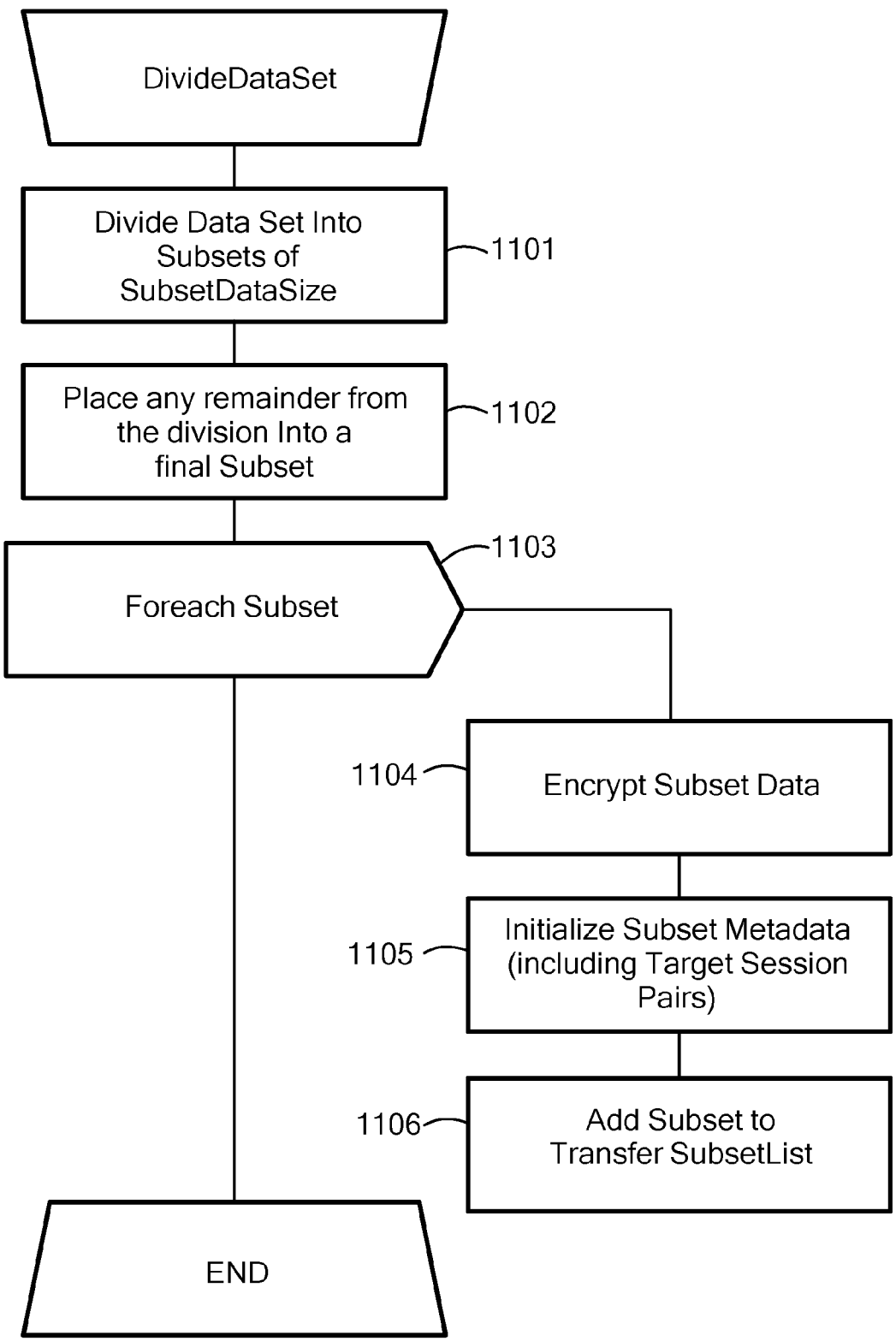

Server:DivideDataSet Procedure
  Inputs: DataSet, BestSize
  Outputs: DataSetTransfer SubsetList
Summary:
  Create the DataSetTransfer SubsetList by dividing a DataSet into pieces i.e. Subsets of a "best size", for the purpose of assigning those Subsets to one or more Devices that will deliver the Subsets to one or more Targets. This spreads the load for delivering the DataSet over multiple Devices. It also helps to ensure a timely, efficient delivery, especially if said Subsets are assigned redundantly and in a non-sequential order to multiple Devices and the Device Queues are dynamically adjusted during the Session to account for Subsets already received by the Target.
Psuedo-Code:
  (Refer to flow chart FIG. 11)

```
Divide DataSet into Subsets of SubsetDataSize
Place any remainder from the division into a final Subset
Foreach Subset
    Encrypt Subset Data
    Initialize Subset MetaData
    Add Subset to DataSetTransfer SubsetList
EndForeach
```

Discussion:
  BestSize for a Subset is a system wide constant that has been previously determined to optimize the amount of data that can be reliably delivered in the brief time that Devices are proximate to Targets. One approach to determine the BestSize would be to test a number of varying scenarios and use the data from those benchmark tests to estimate a BestSize that would provide an acceptable delivery rate. Over time, performance data could be collected to further improve the estimate.

The method described here attempts to minimize the protocol overhead by choosing the largest Subsets that can be consistently delivered. However, this might not be the best strategy if there are a large number of Devices available and the DataSet is of a modest size such that the DataSet gets divided into only a few pieces. In such a case, you may only reasonably be able to use a small portion of the total available Devices and it may make sense to reduce the best size and take advantage of a larger portion of available Devices. Doing so will likely improve delivery times and spread the cost of delivery over a larger number of Devices. On the other hand reducing Subset size produces diminishing returns as the overhead for delivering data eventually becomes onerous.

Other methods of dividing the DataSet will occur to those skilled in the art. For example the BestSize calculation might take into account CostVsTimePriority, the number of available Devices and the size of the DataSet.

In this embodiment (1101-1106), we show the division of a DataSet being done in common for all Targets based on a single BestSize. This assumes that the delivery performance across all Targets is in an acceptable range to the Initiator. However, Targets may vary significantly in the optimum BestSize and other implementations may choose to do the BestSize calculation and subsequent DataSet division on a Target by Target basis or by groups of Targets with similar best sizes.

Subsets contain Data and MetaData This MetaData typically contains a Subset ID, a Subset SequenceNumber, Subset Size and a list of TargetID/SessionID pairs. The list of TargetID/SessionID pairs is essentially an address list. It allows the Device to have one copy of the Subset that can be delivered to multiple Targets. The SessionID of the Pair is used by the Target to identify the Session that this Subset belongs to as it is possible to have multiple concurrent Sessions active at the same time. As Subsets are delivered to a Target, the corresponding TargetSessionPair is removed from the list.

When dividing the DataSet we need to take into account the size of the MetaData:
  SubsetDataSize=BestSize−SizeofMetaData
  if the DataSet is larger than the SubsetDataSize, divide the data into Subsets of that size (1101). The final Subset may contain less data than SubsetDataSize (1102). If the DataSet is less than or equal the SubsetDataSize then there is only one Subset and it may contain less data than SubsetDataSize.
  For each Subset: (1103)
    a. Encrypt just the Subset Data (1104)—Subset MetaData will always remain in the clear, so it can be used by Devices to determine the destination Target.
    b. Initialize the Subset MetaData, including Target Session pairs (1105)
    c. Add the Subset to Transfer SubsetList (1106)

Server:ScoreDevices Procedure
  Input: Target, AllDevicesList
  Output: DeviceScoreList
Summary:
  Using historical data, calculate a score for a Device indicative of its ability to deliver Subsets to the given Target in the proposed time window established in SetupTransfer. Create a DeviceScoreList ordered by Score, highest (highest probability of delivery) Score first The final choice of Devices to be used will be made when Subsets are assigned to specific Devices.
Psuedo_Code:
  (Refer to flow chart FIG. 12.)

```
BEGIN ScoreDevices
    Foreach Device in AllDevicesList
        Score the Device for proposed delivery time window
        Add Device Score to DeviceScoreList
    EndForeach
    Order the DeviceScoreList , highest score first.
END
```

Discussion:
  There are many methods of scoring Devices. One example methods uses historical data to calculate a simple score based on:
    a. Overall Device success in delivering to a given Target=Subsets assigned/Subsets delivered b. Probability of being proximate during the proposed delivery schedule—A Device may be very successful in delivering Subsets to a given Target, but if they are not likely proximate during the desired time frame for delivery then that will significantly diminish probability of success for this Device and Session.
The formula for the score is:

Score=(Subsets assigned/Subsets delivered)*Probability of being Proximate during the delivery window This Scoring formula could be further enhanced by taking into account the historical loading on individual Devices relative to other Devices. Over the course of many Sessions, it generally will be desirable to spread the load (cost) of delivering DataSets as evenly as possible given the constraints of a timely delivery. So a historically high loading, i.e large number of Subsets delivered compared to other Devices would yield a lower score. As an example, the Score derived above would be adjusted:

Score=Score/Load Factor

Where Load Factor=Total Subsets delivered by this Device/Average Subsets Delivered per Device A very simple method of scoring is possible using other information that may be known by the system. For example, in the case of an access control system it can be inferred that if a Device has been issued a key for a locking Device that it has a reasonable probability of being proximate to that Device. If no key has been issued then it may be reasonable to initially assume that the Device is less likely to be proximate. The score for a Device could be a binary score: 0 if no Key issue 1 if a Key is issued.

Other methods of scoring candidate Devices will occur to those practiced in the art. For example, Bayesian statistical methods with historical data and additional evidence i.e. knowledge about the nature of the Target, Devices, Devices Users, Session parameters etc. could be used to improve on a score generated purely from performance data mentioned previously. From the previous example of binary scoring in an access control system—having knowledge that a key was issued to Device user as well as timing and frequency of key usage is valuable evidence that can be used with Bayesian Statistics to improve the scoring of Devices beyond a simple binary level.

Figure 12:
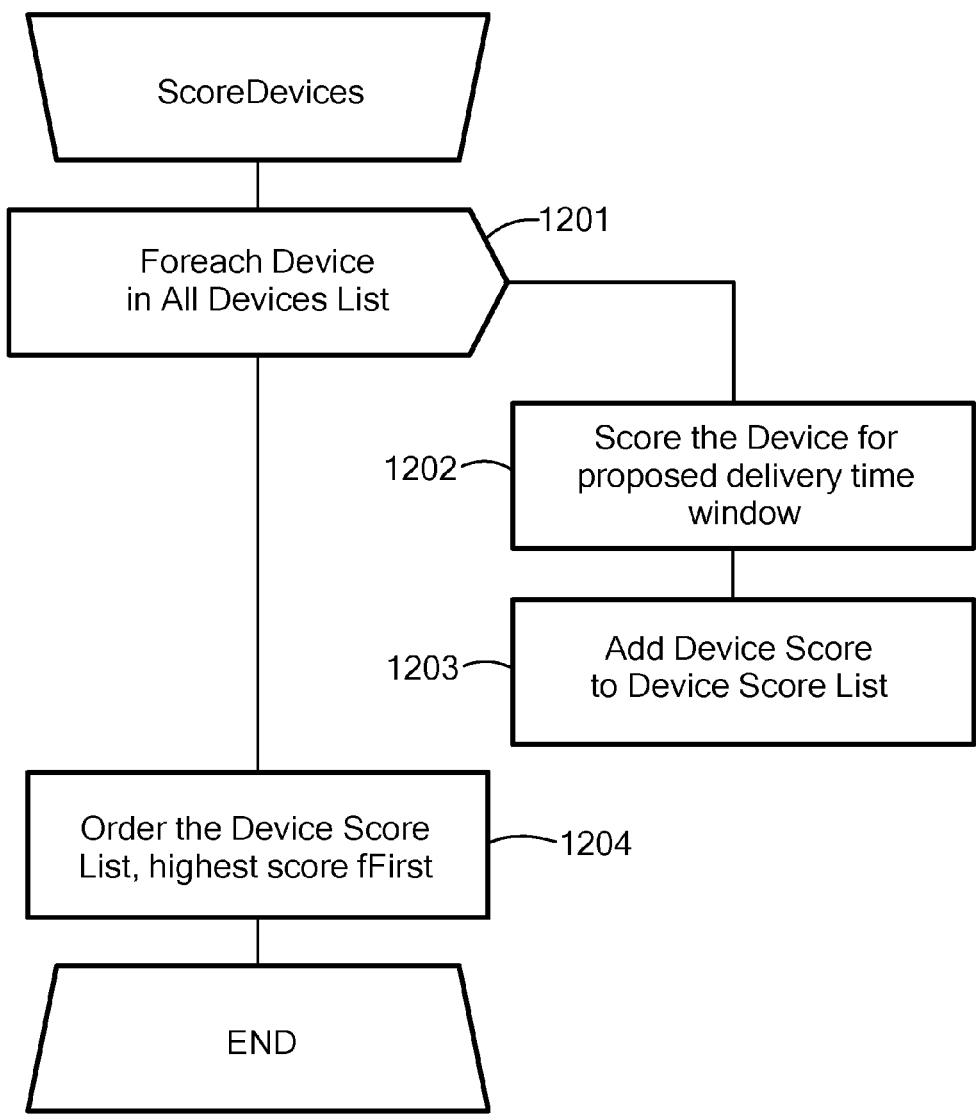

In this embodiment (FIG. 12.)
For Each Device in The AllDevicesList (1201):
a. A score is calculated relative to the given Target for the proposed delivery time window (1202)
b. The DeviceScore is added to The DeviceScoreList (1203)
The DeviceScoreList is ordered, highest DeviceScore first (1204)
Server:AssignSubsets Procedure
Inputs: Target, DataSetTransfer, DeviceScoresList, CostVsTime Priority
Outputs: Subsets assigned to Device Queues, Session DeviceLists updated
Summary:
Chose the "best" Candidate Devices for delivery of a Subset to the given Target as a function of DeviceScoresList, a Score Threshold and the number of Candidates Requested. Add the Subsets to one or more of those Candidate Devices Queues based on CostVsTime priority. When a Device is assigned a Subset add the Device to the Session DeviceList if it is not already there.

Figure 13A:
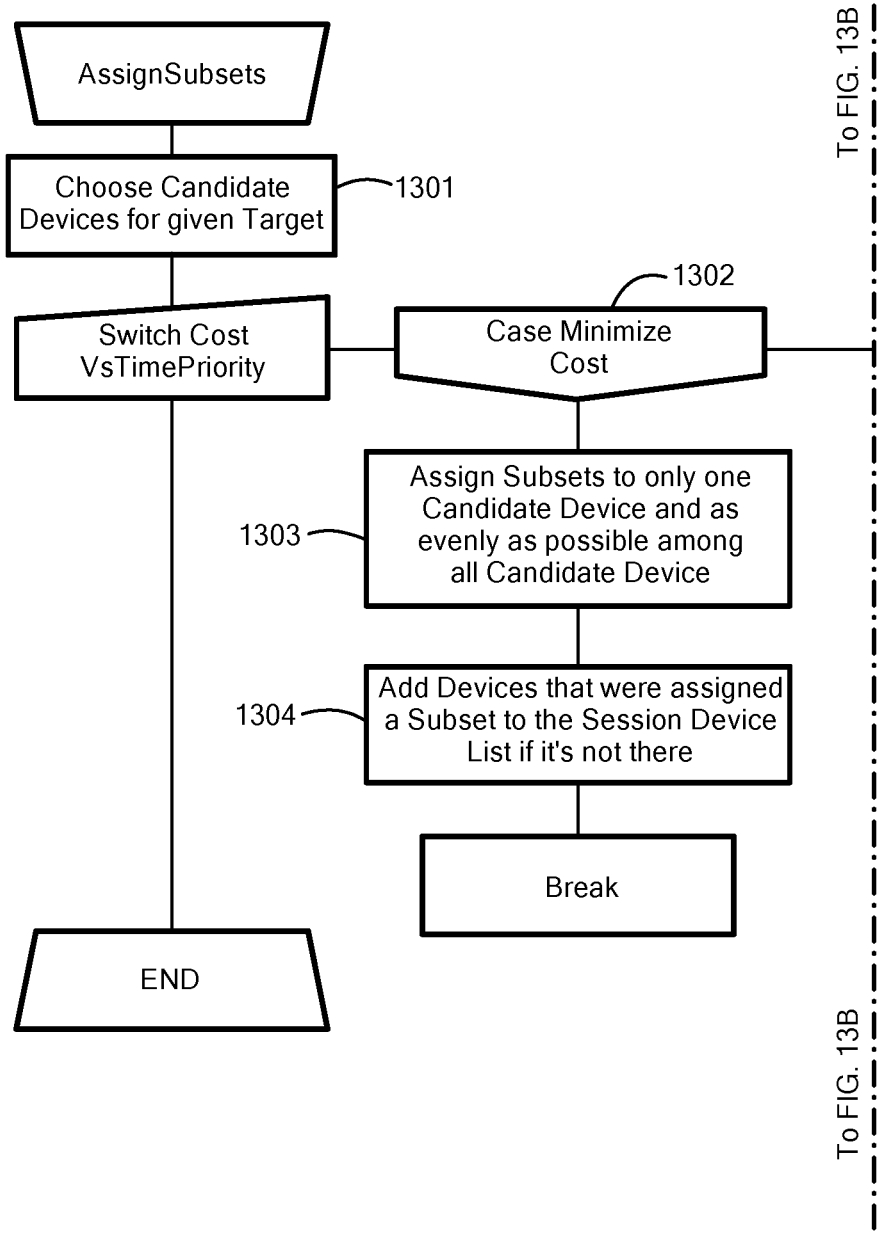
Figure 13B:
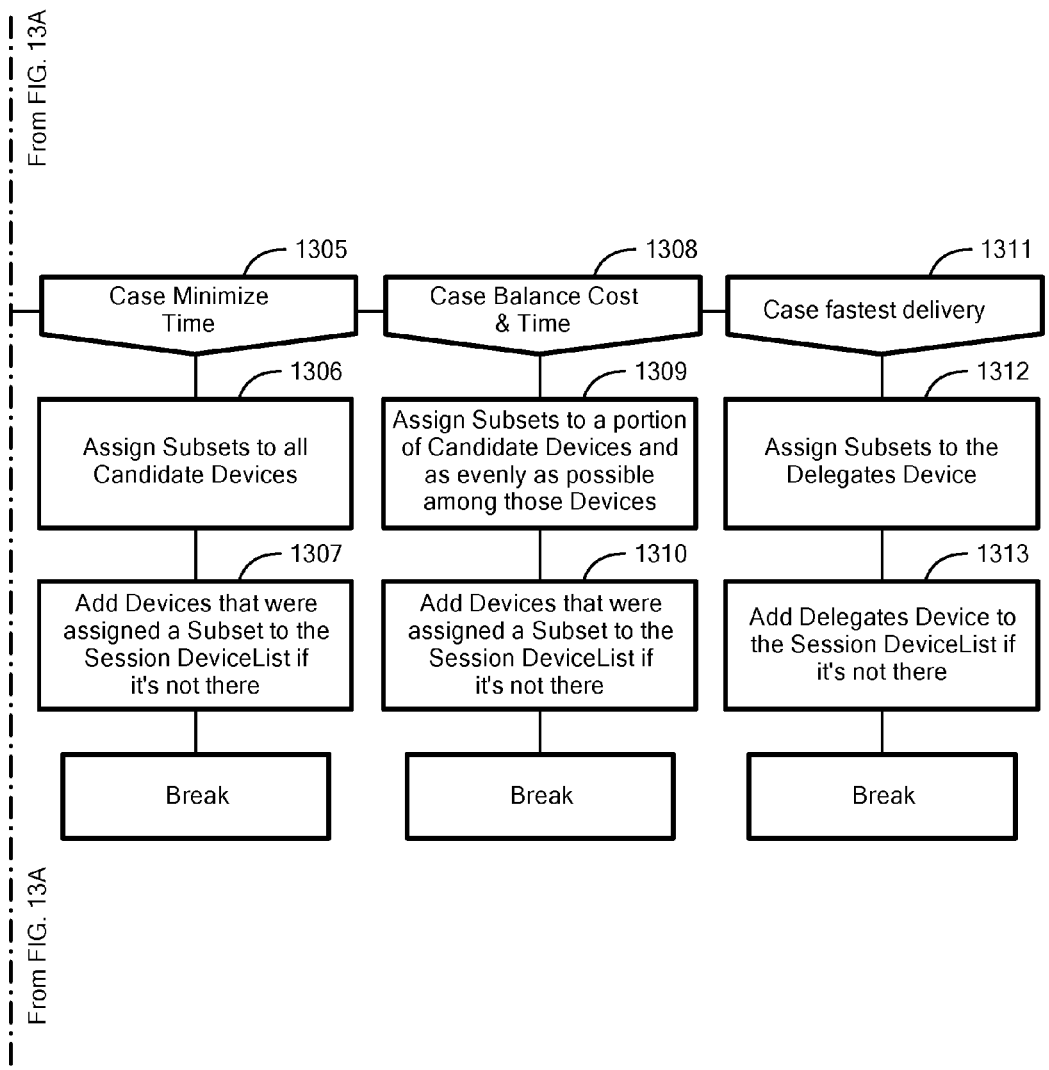

Psuedo_Code:
(Refer to flow chart FIG. 13)

```
BEGIN AssignSubsets
    Choose Candidate Devices for given Target
    Switch CostVsTimePriority
        Case Minimize Cost
            Assign Subsets to only one Candidate Device and as
            evenly as possible among all Candidate Device
            Add Devices that were assigned a Subset to the
            Session DeviceList if it's not there.
            Break
        Case Minimize Time
            Assign Subsets to all Candidate Devices
            Add Devices that were assigned a Subset to the
            Session DeviceList if it's not there.
            Break
        Case Balance Cost & Time
            Assign Subsets to a portion of Candidate Devices and
            as evenly as possible among those Devices
            Add Devices that were assigned a Subset to the
            Session DeviceList if it's not there.
            Break
        Case fastest delivery
            Assign Subsets to the Delegates Device
            Add Delegates Device to the Session DeviceList if
            it's not there.
            break
    EndSwitch
END
```

Discussion:
Choose Candidate Devices (1301)
There are many ways to implement choosing the "best" candidate Devices for a the given Session Target. The method used in this examples is a function F(Sl, Th, N) where Sl=DeviceScoreList, Th=score threshold, N=desired number of candidate Devices (N=0 returns all possible Candidate Devices). Note that the function may return fewer than N candidate Devices depending upon the criteria and number of Devices in the DeviceScoresList.
One possible implementation of this function is:
Take the top scoring N Devices from the DevicesScoresList whose Score is => than threshold Th. If there are only M Devices with a Score=>Th, where (M<N) then return M candidate Devices. Threshold Th is initially determined by empirical estimate and is adjusted over time based on historical data to provide a probability of timely delivery to a Device that is acceptable to the initiator.
Based on CostVsTimePriority, we select one or more Devices from the Candidate Devices and assign Subsets (place Subset in Queue) accordingly. For example:
For the case of CostVsTimePriority=Minimize Cost (1302)
We want to have no redundancy of Subsets between Devices so we select a maximum of "J" Devices from the candidate Device list such that J=number of Subsets in the transfer. Subsets are assigned to only one Device (1303). In the event that the number of candidate Devices available is less than the number of Subsets then we assign Subsets as evenly as possible among ail available Devices. When a Device is assigned a Subset add it to the Session DeviceList if it is not already there (1304).
For the case of CostVsTimePriority=Minimize Time (1305)
We want maximum redundancy of Subsets between Devices. We use all candidate Devices returned by F(Sl, Th, N). Subsets are assigned to all candidate Devices (1306). When a Device is assigned a Subset add it to the Session DeviceList if it is not already there (1307).

Figure 14:
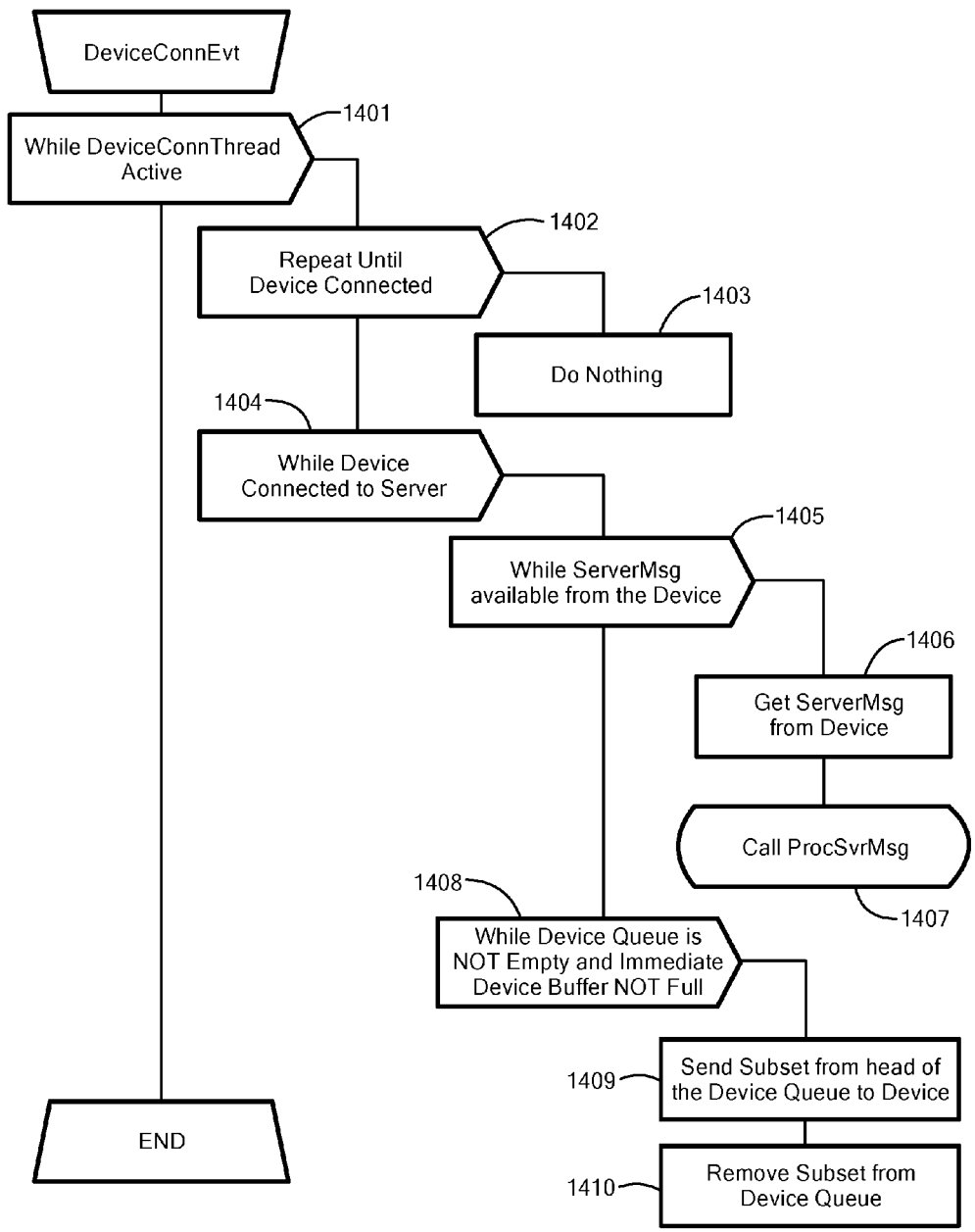

For the Case of Balanced Time & Cost: (1308)
    We want some redundancy between Devices so we use all candidate Devices and assign each Subset to a portion, "K" candidate Devices and as evenly as possible across those Devices (1309). "K" is determined from historical data to yield a balance of Time of Delivery and Cost of Delivery acceptable to the Initiator. In the event that "K" is larger than the number of Candidate Devices then Subsets are assigned to all candidate Devices. When a Device is assigned a Subset add it to the Session DeviceList if it is not already there (1310).
For The Case of Fastest Delivery: (1311)
    Assign all Subsets to the Device of a delegated user who has agreed to be proximate the Target(s) for the duration of the Session (1312). Add the Device to the Session DeviceList if it is not already there (1313).
Server:DeviceConnEvt Procedure
    Inputs: ServerMsg(s) from Device
    Outputs: Subsets removed from Device Queues
Summary:
    Handles the event of a Device Connection to the Server. Gets any Server Messages from the Device forwarded from the Target or originating in the Device. Processes these Messages and sends Subsets to Device for forwarding to designated Target.
Psuedo_Code:
    (Refer to flow chart FIG. 14)

```
BEGIN DeviceConnEvt
    While DeviceConnThread Active
        Repeat until Device connected
            Do Nothing
        EndRepeat
        While Device connected to Server
            While ServerMsg available from the Device
                Get ServerMsg from Device
                Call ProcSrvrMsg
            EndWhile
            While Device Queue is NOT empty and Device
            buffer NOT full
                Get Subset at Head of Queue
                If Subset has MetaData containing at least one
                TargetSessionPair
                    Send Subset to Device
                Else
                    If Subset MetaData Type = DEVICE
                        Send Subset to Device
                    EndIf
                EndIf
                Remove Subset from Device Queue
            EndWhile
        EndWhile
    EndWhile
END
```

Figure 15:
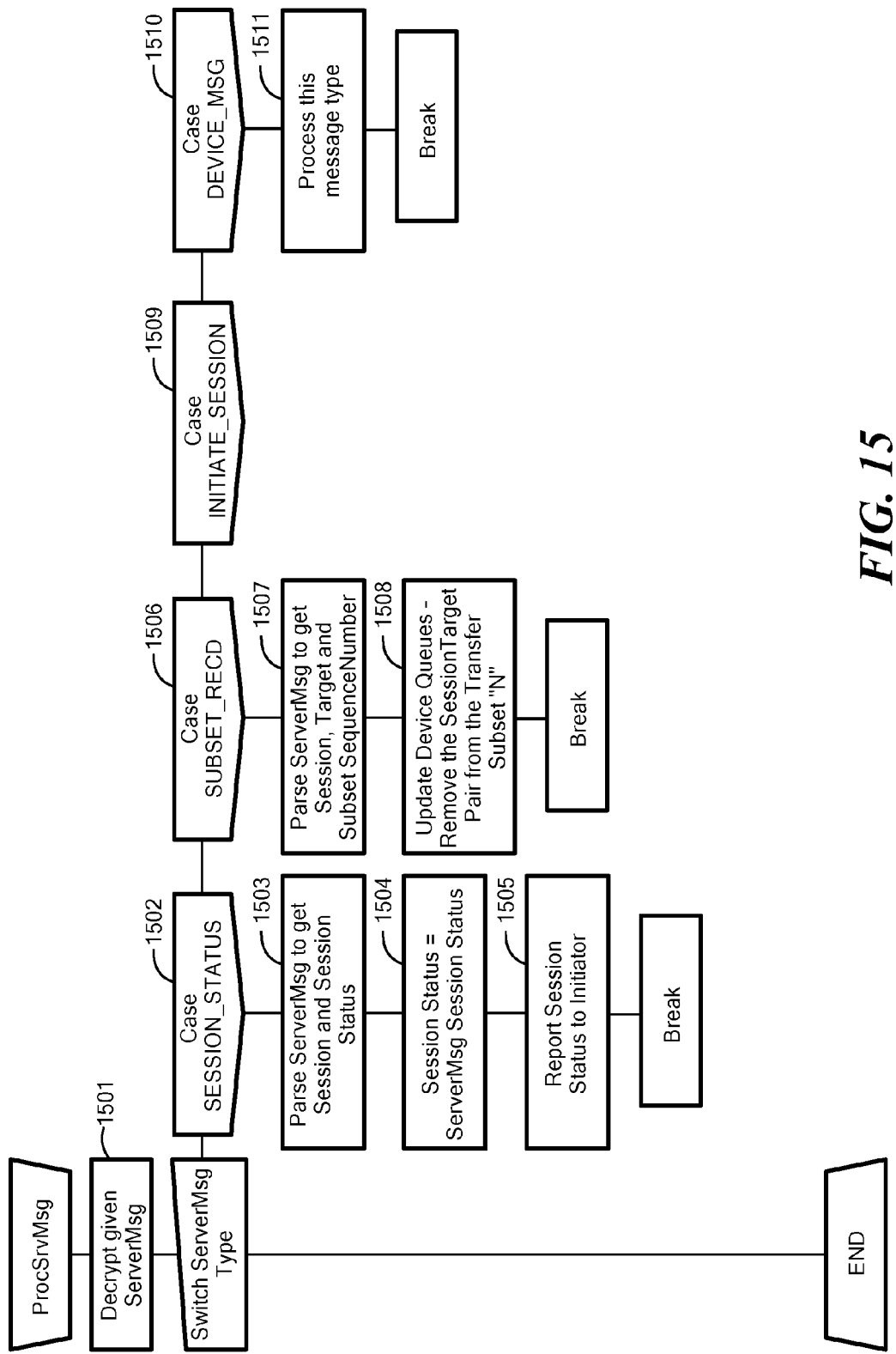

Discussion:
    This procedure runs as a thread and is started by TransferDataSet Procedure. It continues to run (1401) and waits for a Device connection to the Server (1402,1403)) until The Transfer is complete.
    While the Device is connected (1404) it gets any available ServerMsg from the Device (1405,1406). The ServerMsgs could be from either the Target or also the Device itself. The ProcSrvrMsg routine is called for each ServerMsg to process said messages (1407).
    When all ServerMsgs have been retrieved and the Device is still connected, Subsets with at least one TargetSessionPair Or Subsets for the Device are sent to the Device while Device Queue in the Server is NOT empty and The Device buffers are not Full (1408,1409). When Subsets have been processed they are removed from the Device Queue (1410). While not shown and not required, It may be advantageous for debug and reporting purposes to update Session Subset Status to increment the QueuedCount and to set Subset Status to QUEUED if the previous QueuedCount was zero.
Server:ProcSrvrMsg Procedure
    Inputs: ServerMsg
    Outputs: Session Related Data update and Device Queues updated as appropriate
Summary:
    Processes the given ServerMsg. Messages are decrypted, the message type is determined and processed accordingly. Session Status and the contents of Device Queues are dynamically updated as appropriate.
Psuedo_Code:
    (Refer to flow chart FIG. 15)

```
BEGIN ProcSrvrMsg
    Decrypt given ServerMsg
    Switch ServerMsg Type
        Case SESSION_STATUS
            Parse ServerMsg to get Session and Session
            Status
            Session Status = ServerMsg Session Status
            Report Session Status to Initiator
            break
        Case SUBSET_RECD
            Parse ServerMsg to get Session, Target and
            Subset SequenceNumber
            Update Device Queues - Remove the
            SessionTargetPair from the corresponding
            Transfer Subset
            break
        Case INITIATE_SESSION
        Case DEVICE_MSG
            Process this message type
            break
    EndSwitch
END
```

Discussion:
    The given ServerMsg is decrypted (1501). The message is then processed according to its Type:
    For the case of Type=SESSION_STATUS (1502):
        This is an indication from the Target that the Session has completed and accordingly the Session Status will be either SUCCESS or FAILED. By implication, all Subsets for the Transfer to this Target have been previously reported to the Server as being received so the MetaData of all Transfer Subsets no longer contain a TargetSessionPair corresponding to this Target and Session. Devices that still have Subsets Queued for the Transfer will not unnecessarily send those Subsets to this Target. The ServerMsg is parsed to obtain the Session and Session Status (1504). We then Set the Sessions Status to the Session Status received in this message and report the Session Status to Initiator (1505).
    For the case of Type=SUBSET_RECD (1506):
        This is an indication from the Target that a Subset with SequenceNumber "N" has been successfully received by the Target. The ServerMsg is parsed to obtain the Session, Subset SequenceNumber and Target (1507). In order to avoid sending this Subset to the Target again we dynamically update Session Device Queues. Device Queues only contain references to Subsets (Subset Ds) so this is done by removing the SessionTargetPair from the Transfer Subset "N" MetaData (1508).

For the case of Type=INITIATE_SESSION (1509):
: This is a request from the Target to initiate a Session. One case where this might happen is when the Target Requests the Sever to upload data when the buffer for said data in the Target is nearing its capacity. Process accordingly (l511), details are not important to this example.

For the case of Type=DEVICE_MSG (1510):
: The Message originating from the Device rather than the Target might deliver performance statistics related to the delivery of Subsets accumulated over time by the Device. Process accordingly (1511), details are not important to this example.

Other types and uses for ServerMsgs will occur to those skilled in the art.

Device: SrvrEvtHandler Procedure
: Inputs: Subsets From Server
: Outputs: ServerMsgs To Server Summary:
: The SrvrEvtHandler regularly attempts to connect to the Server. When a Device-Server connection is established data are sent and received. The Device-Server Connection is terminated, All Targets are removed from the ServicedList and a time is established for the next Server Connection attempt.

Figure 16:
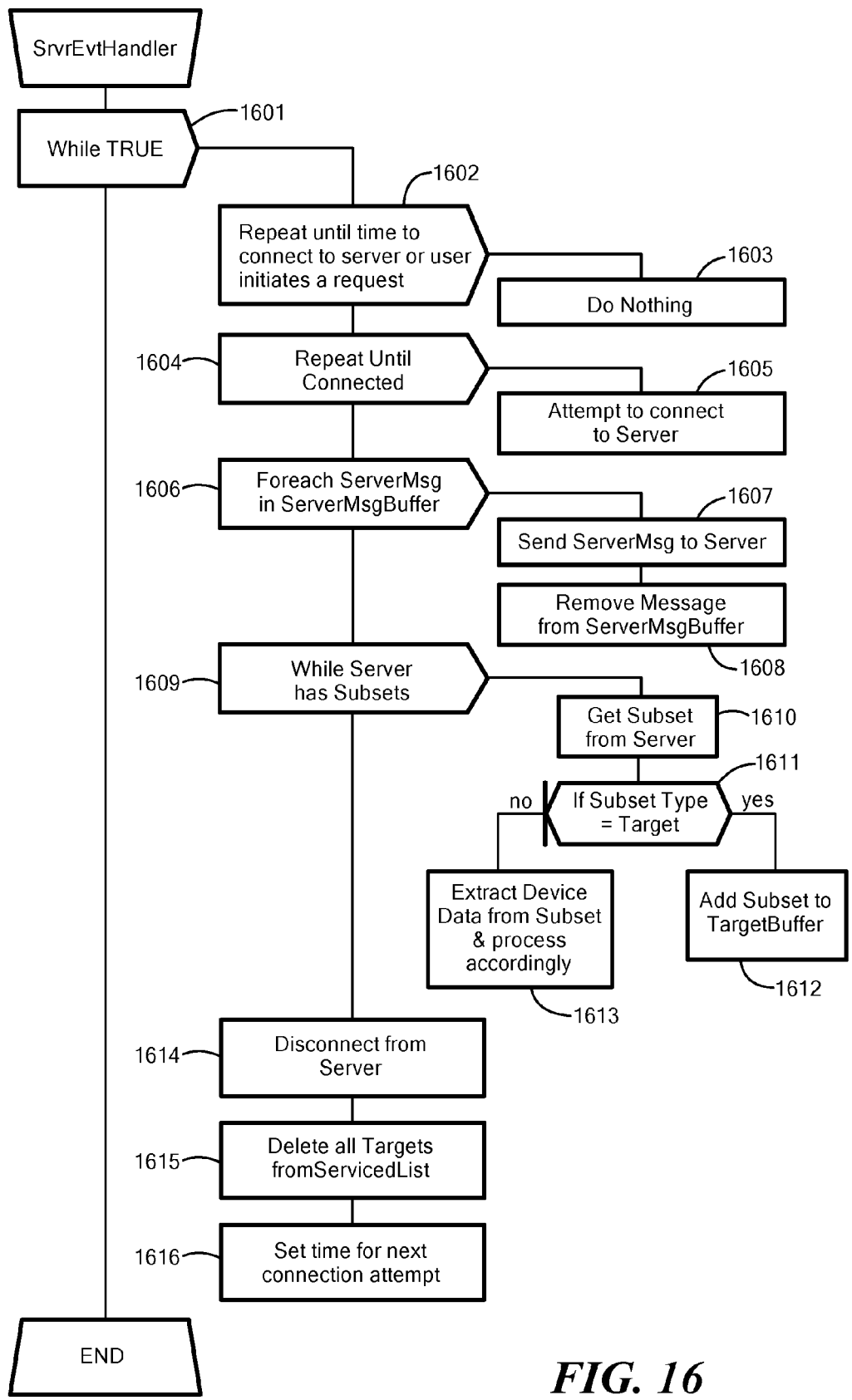

Psuedo_Code:
: (Refer to flow chart FIG. 16)

```
BEGIN SrvrEvtHandler
    While TRUE
        Repeat until time to connect to server or user initiates a
        request
            Do Nothing
        EndRepeat
        Repeat until Connected
            Attempt to connect to server
        EndRepeat
        Foreach ServerMsg in ServerMsgBuffer
            Send ServerMsg to Server
            Remove Message from ServerMsgBuffer
        EndForeach
        While Server has Subsets
            Get Subset from Server
            If Subset Type = Target
                Add Subset to TargetBuffer
            Else
                Extract Device Data from Subset & process
                accordingly
            EndIf
        EndWhile
        Disconnect from Server
        Delete all Targets from ServicedList
        Set time for next connection attempt
    EndWhile
END
```

Discussion:

The Device tries to connect to the Server on a somewhat regular basis (1601-1605), for example based on a time determined by the Device or when the Device user deems it necessary to connect to the Server to retrieve data. In the example of an access control system the user may wish to initiate a connection to update his access keys. The next connect time determined by the Device could be a predetermined fixed time since the last connection or it might be based on other data known to the Device such as current Device location.

When a connection is established the Device sends any ServerMsgs in the ServerMsg buffer to the Server (1606, 1607). It removes the sent message from the ServerMsg buffer (1608). After all available ServerMsgs have been sent a request is made to the Server for any Subsets (1609). If there are any available Subsets they are retrieved (1610) and processed according to the type of Subset (1611)

For the case of Target Subsets:
: If Target Subsets are available from the Server they are retrieved and placed in the Target Buffer (1612).

For the case of Not Target Subsets (i.e they are Device Subsets):
: If the Server has Subsets related to the operation of the Device, the Device retrieves said Subsets and they are processed to extract Device Data (1613). Details of processing are not important in this embodiment. In the example of the access control system Device Data might be the list of access keys and the Meta-Data associated with those keys.

Disconnect from Sever after all Subsets are retrieved from Server (1614).

Delete all Targets from ServicedList (1615).

Set the time for the next connection attempt (1616).

The procedures of Sending ServerMsgs to Server or receiving Subsets can be done in any order, but generally it will be advantageous for system efficiency to send ServerMsgs before retrieving Subsets. This allows the Server to dynamically update the contents of the Device Queues. Consequently, Subsets will not unnecessarily be sent to this Device (and other Devices) because the Session has completed or the Target has received the Subset from another Device.

It should be noted that the Device does not require knowledge of Target Session status as that is managed by the Server. However it would be advantageous for the Server to notify the Device via a Device Subset that the Session is complete for a particular Target. It would then be possible for the Device to remove the TargetSessionPair from any Subsets it has in the TargetBuffer. This prevents unnecessarily sending Subsets to a Target when the Target has already received all Subsets in the DataSet.

Error handling in the event of a Server disconnect or Target Buffer overflow or other error conditions are omitted for sake of clarity. The methods to do this are well known.

Figure 17A:
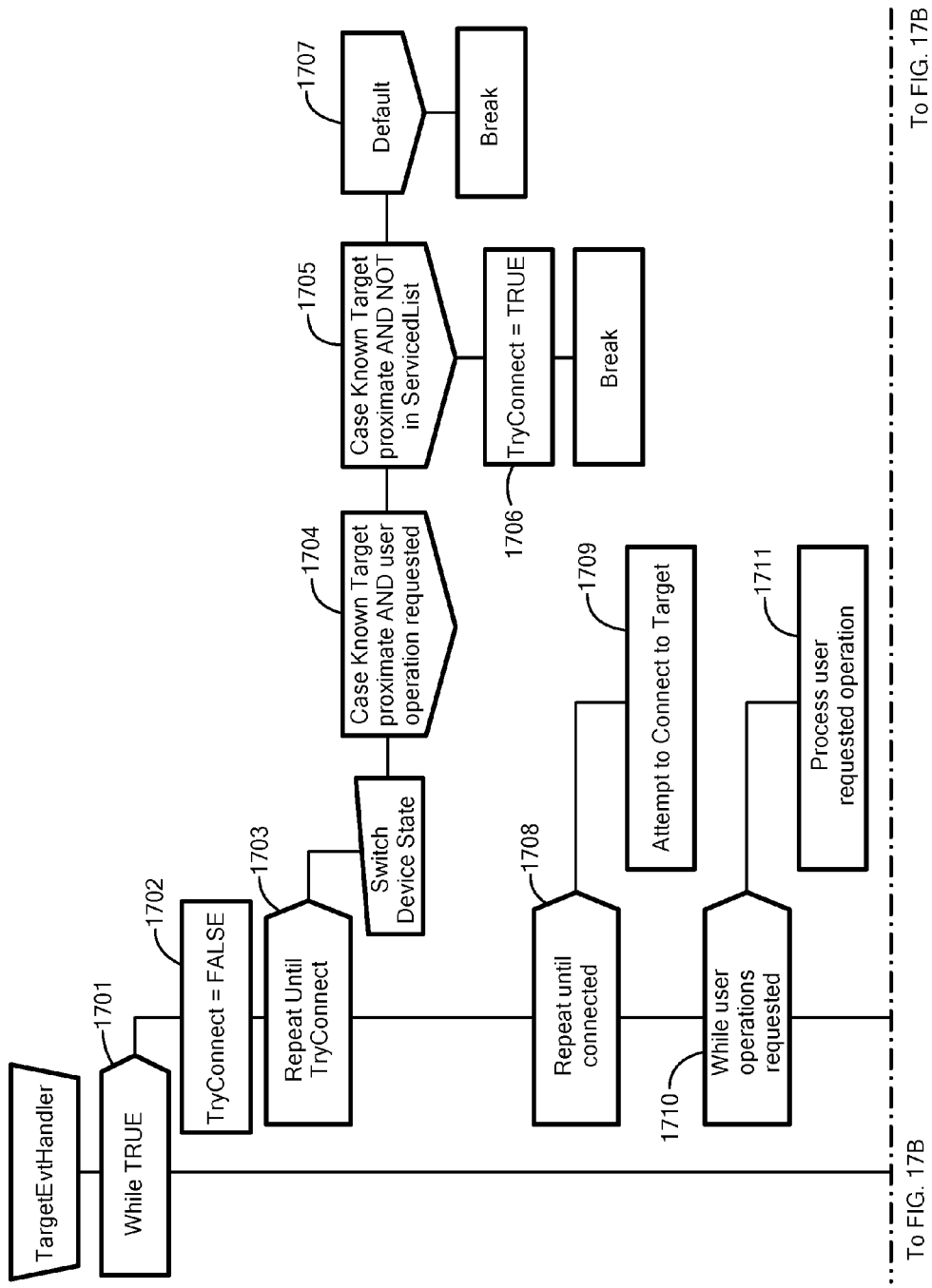
Figure 17B:
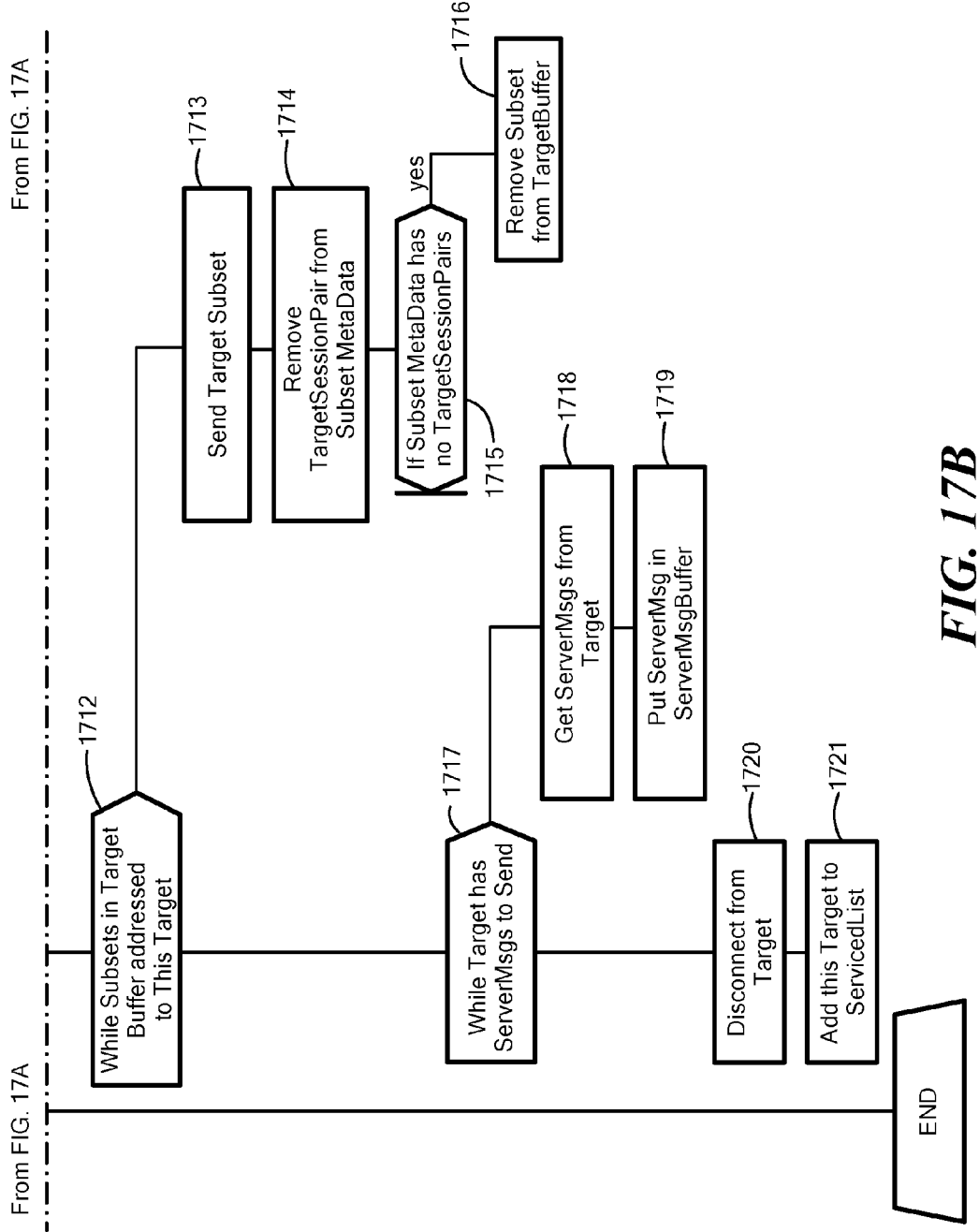

Device: TargetEvtHandler Procedure
: Inputs: TargetBuffer,ServerMsgs from Target
: Outputs: Target Subsets delivered to Target, Updated—ServerMsgBuffer, TargetBuffer,Serviced List Summary:
: The TargetEvtHandler continuously attempts to connect with proximate Targets meeting certain Criteria. When a connection is made:
: Process any user requested operations
: Send any available Subsets to the Target
: Get any available ServerMsgs from the Target
: Disconnect from the Target
: Add this Target to the Serviced List Psuedo_Code:
: (Refer to flow chart FIG. 17)

```
BEGIN TargetEvtHandler
    While TRUE
        TryConnect = FALSE
        Repeat Until TryConnect
            Switch Device state
                Case Known Target proximate AND User operation
                requested
```

-continued

```
            Case Known Target proximate AND NOT in ServicedList
                TryConnect = TRUE
                break
            Default
                break
            EndSwitch
        EndRepeat
        Repeat until connected
            Attempt to connect to Target
        EndRepeat
        While User Operations requested
            Process User requested operation
        EndWhile
        While Subsets in TargetBuffer addressed to This Target
            Send Target Subset
            Remove TargetSessiionPair from Subset MetaData
            If Subset MetaData has no TargetSessionPairs
                Remove Subset from TargetBuffer
            EndIf
        EndWhile
        While Target has ServerMsgs to send
            Get ServerMsg from Target
            Put ServerMsg in ServerMsgBuffer
        EndWhile
        Disconnect from Target
        add This Target to ServicedList
    EndWhile
END
```

Discussion:

Targets are said to be known to the Device if the Device can determine that the Target provides services consistent with the operations to be carried out. This may be done by implication from data broadcast by the Device or directly by actively querying the Target to discover its identity and or services.

When proximate a known Target meeting the following conditions: NOT in Serviced list OR a Target where the Device user has requested an operation (1703-1706). The Device attempts to connect to said Target (1708-1709).

When connected, the Device first carries out any operations requested by the Device user (1710-1711). In the example of the access control system this might be to request an unlock using keys stored on the Device. This step is optional and not required. It also does not matter whether this step succeeds or fails as long as the failure is not due to loss of connection.

The Device checks to see if the TargetBuffer contains any Subset destined for the connected Target by checking Subset MetaData to see if it has a TargetSessionPair for the connected Target (1712). It then sends any such Subsets to the Target (1713) and updates the Subset MetaData for those Subsets by removing the TargetSessionPair corresponding to the Target (1714). If there are no TargetSessionPairs remaining, remove the Subset from the TargetBuffer (1715). Optionally, to conserve bandwidth the Device may remove all TargetSessionPairs from Subset MetaData except for the one corresponding to the current Target when sending a Subset to said Target.

The Device then requests from the Target any available ServerMsgs and if any are available (1717) it saves them in its ServerMsgBuffer (1718-1719)

The Device disconnects from this Target (1720)

It adds the Target to the ServicedList (1721), signifying that we have serviced this Target since the last time we connected to the Server. If a Target is in the ServicedList reconnecting to it before the next Server Connection will be a very low priority. We want to connect to Targets that have not been Serviced, It should be noted that the Device is merely a pass thru mechanism. The data for Subsets and ServerMsgs that flow thru the Device are encrypted with a key known only to the Server and Target. The Device plays no role in the security of these transactions and the Device does not need to be authenticated by the Target for operations involving Subsets and ServerMsgs.

However, operations requested by the Device user might require authentication between the Target and the Device. In the example of the access control system the key obtained from the Server may already contain sufficient information to authenticate the Device in a system that requires only a moderate level of security. In a case where high security is required, additional authentication between the Target and the Device might be prudent.

The order of operations—user requests, send Target Subsets and get ServerMsgs described above is not critical, but generally it will be best to do the process in the priority suggested. In the example of the access control system the highest priority is to do the user requested operation of unlocking a door. The other operations are not essential as the ServerMsgs and Target Subset can be delivered by another Device. Generally speaking it will be advantageous to get ServerMsgs after Target Subsets are delivered so the Target can report receipt of said Subsets promptly.

Error handling in the event of dropped Target connection, buffer overflows etc are omitted for sake of clarity. The methods and procedures for this type of error handling are well known.

Target:DeviceEvtHandler Procedure

Inputs: Subsets from Device

Outputs: ServerMsg To Device, New/Updated TargetSession

Summary:

This procedure waits for a connection to be made to a Device. When such a connection is established:

Get any User commands and process

Gets any available Subsets from Device

Process the Subsets according to Type

Send any available ServerMsgs to Device

Figure 18A:
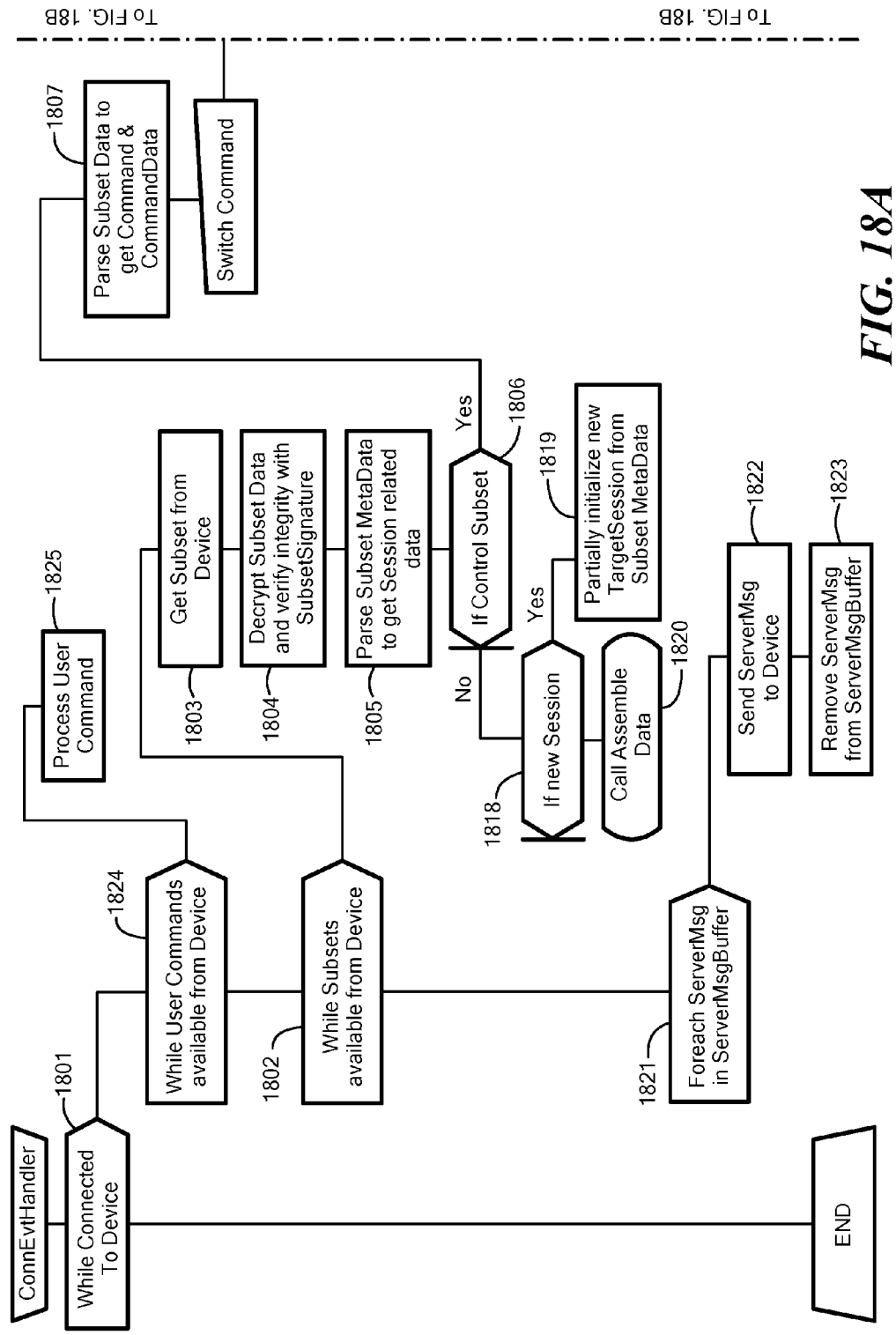
Figure 18B:
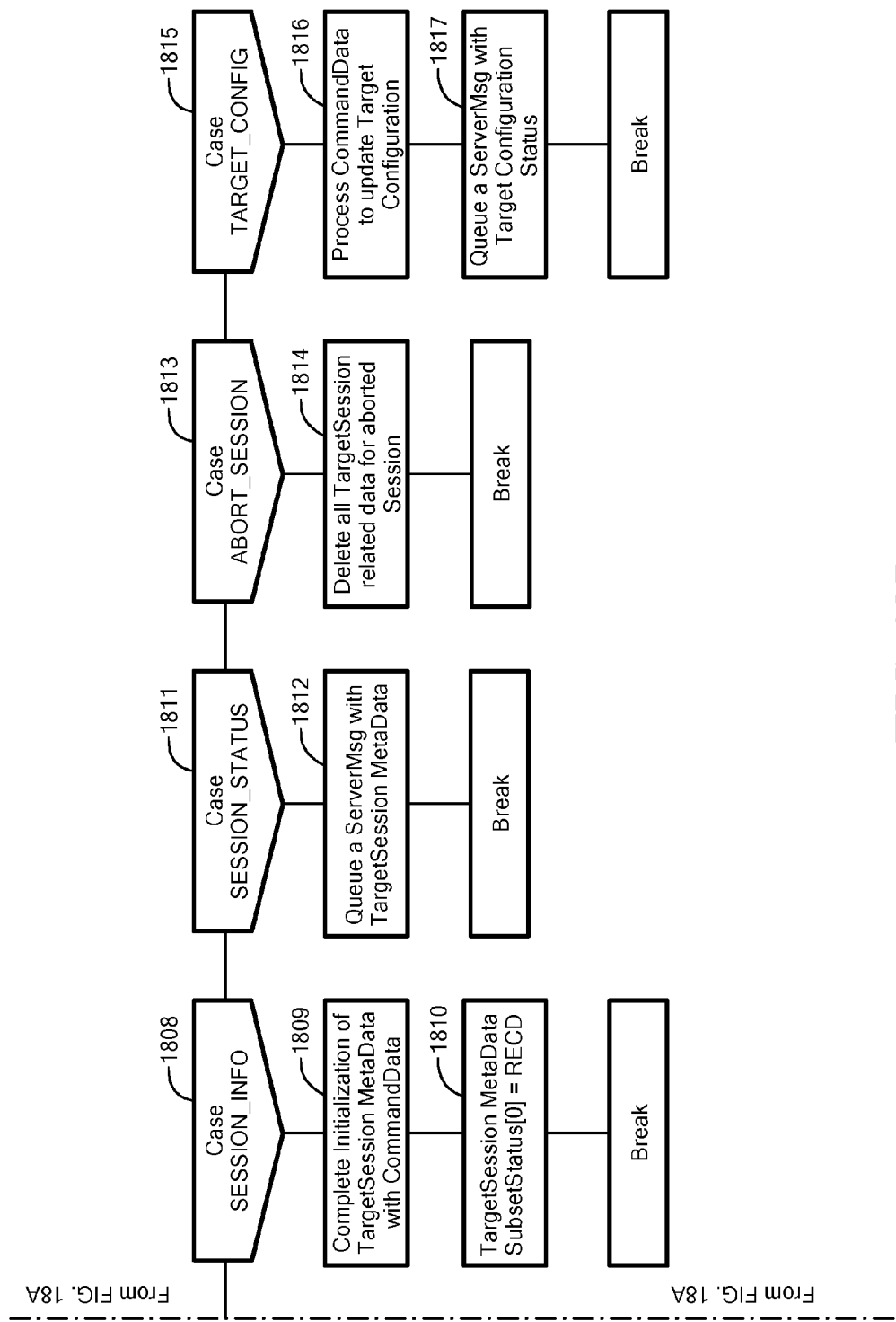

Psuedo_Code:

(Refer to flow chart FIG. 18)

```
BEGIN DeviceEvtHandler
    While Connected To Device
        While User Commands available
            Process User Command
        EndWhile
        While Subsets available from Device
            Get Subset from Device
            Decrypt Subset Data and verify integrity with
            SubsetSignature
            Parse Subset MetaData to get Session related data
            If Control Subset
                Parse Subset Data to get Command & CommandData
                Switch Command
                Case SESSION_INFO
                    Complete Initialization of TargetSession
                    MetaData with CommandData
                    break
                Case SESSION_STATUS
                    Queue a ServerMsg with TargetSession
                    MetaData SubsetStatus
                    break
                Case ABORT_SESSION
                    Delete all TargetSession related data for
                    aborted Session
                    break
```

```
            Case TARGET_CONFIG
                Process CommandData to update Target
                Configuration
                Queue a ServerMsg with Target
                Configuration Status
                break
            EndSwitch
        Else
            If new Session
                Partially initialize new TargetSession
                from Subset MetaData
            EndIf
            Call AssembleData
        EndIf
    EndWhile
    Foreach ServerMsg in SeverMsgBuffer
        Send ServerMsg to Device
        Remove ServerMsg from SeverMsgBuffer
    EndForeach
EndWhile
END
```

Discussion:

Wait for a connection with Device (1801), when connection is established:

While User Commands available, Process User Command (1824,1825). In the example of the access control system a user command might be to request an unlock.

While there are Subsets available from the Device (1802):

Get Subset from Device (1803) and Decrypt Subset Data and verify its integrity with Subset MetaData SubsetSignature (1804).

If Subset MetaData Type=CONTROL (1806) then parse the Command and CommandData from the decrypted Subset data (1807). Process the Command accordingly:

For the case of SESSION_INFO (1808): Complete the initialization of the corresponding (ID=Session ID) TargetSession MetaData with DataSetSignature, and NumDataSetSubsets (1809). A Control Subset is always SequenceNumber=0. Mark Subset 0 as RECD (1810). This additional Session information is required to determine when all DataSet Subsets have been received and to check the integrity of the DataSet. Typically the DataSetSignature will be a CRC of the entire DataSet.

For the case of SESSION_STATUS (1811): queue a ServerMsg containing the Session ID whose Status was requested along with the corresponding TargetSession MetaData, which includes SubsetStatus[ ] and NumSubsetsRecd (1812). Upon receipt of this ServerMsg the Server can dynamically update Device Queues so that Subsets that have already been received by this Target are not sent redundantly.

For the case of ABORT_SESSION (1813): delete all data related to the corresponding TargetSession (1814)

For the case of TARGET_CONFIG (1815): Process CommandData to update the Target Configuration (1816). In the example of an access control system this might be configuration items such as amount of time to unlock, whether or not to audibly signal the unlock.

If Subset MetaData Type is not=CONTROL (1806,1818) and if a TargetSession corresponding to Subset SessionID (found in Subset MetaData TargetSessionPair) would be a new TargetSession, then create a TargetSession with an ID=to the aforementioned Subset SessionID. (1819)

Call AssembleDataSet with the received Subset (1820) which will process the Subset and when all Subsets for the DataSet have been received check the integrity of the DataSet and process the DataSet Accordingly.

Send any available ServerMsgs in the ServerMsgBuffer to the Device (1821,1822), remove sent ServerMags from ServerMsgBuffer (1823).

Target:AssembleDataSet Procedure

Inputs: Subsets,TargetSessions

Outputs: ServerMsg To Device, New/Updated TargetSession

Summary:

Get Session Id and Subset Sequence Number from Subset MetaData

Discard Subset if previously received

Save newly Received Subset according to it's SequenceNumber and SessionID

When All Subsets Received, verify DataSet and process. Report Success/Failure by queueing a Server Message.

Figure 19A:
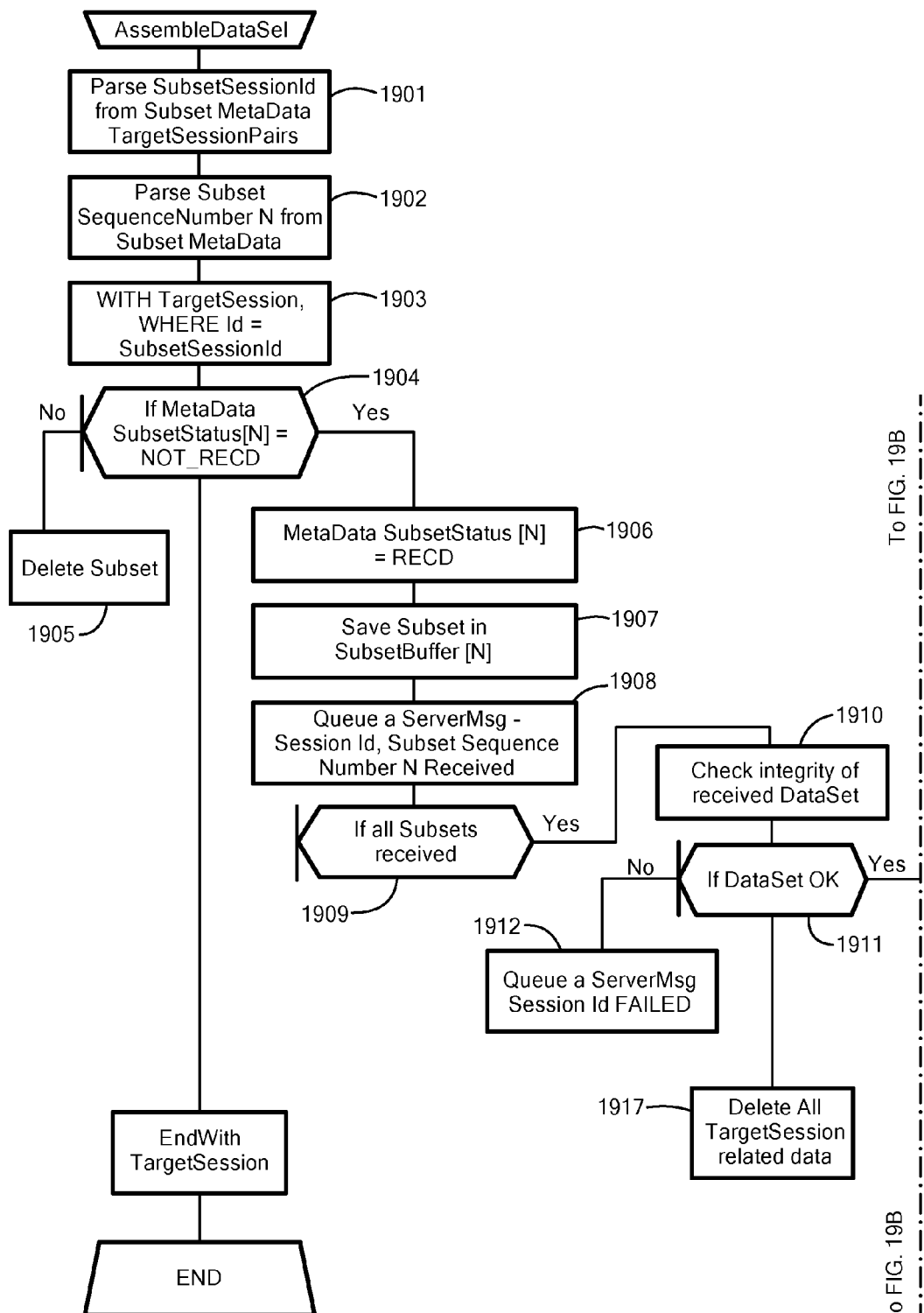
Figure 19B:
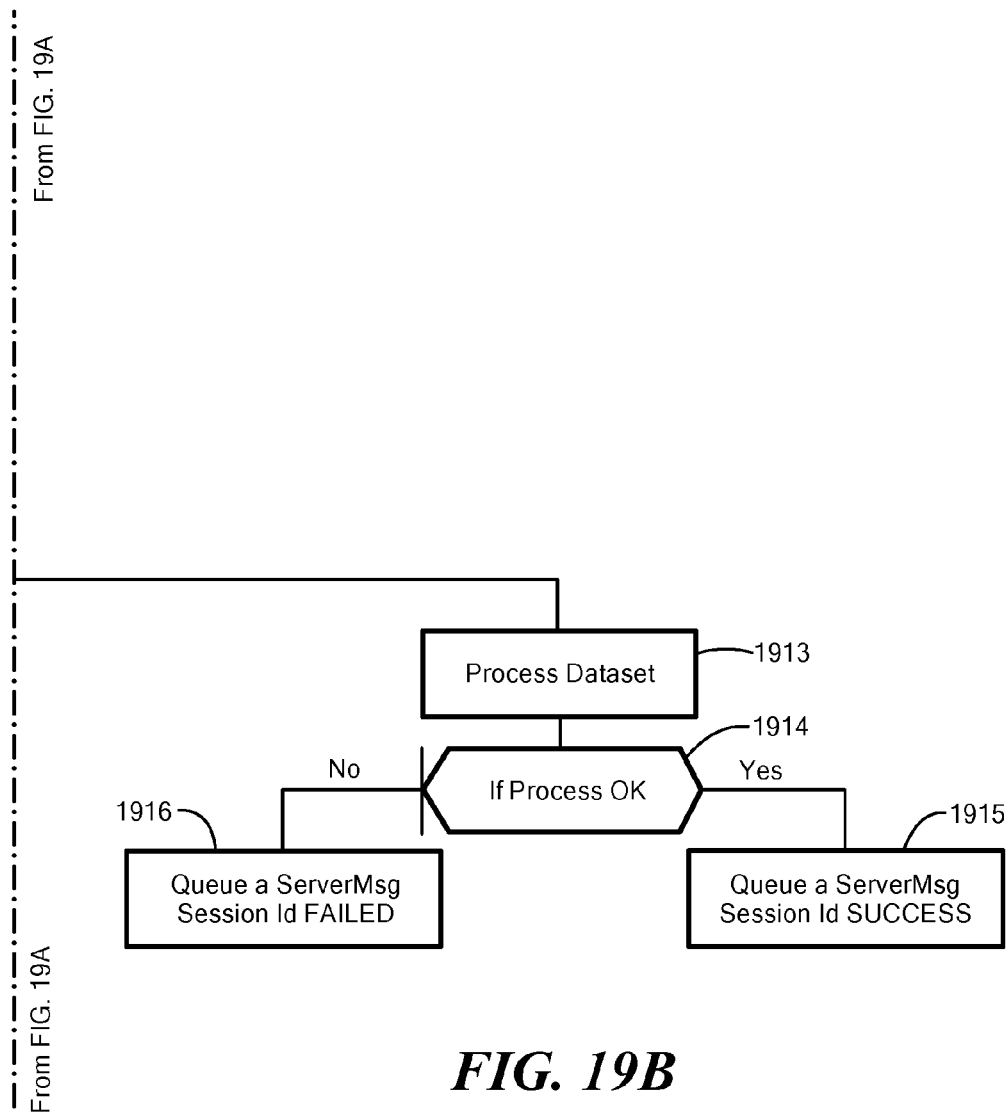

Psuedo_Code:

(Refer to flow chart FIG. 19)

```
BEGIN AssembleDataSet
    Parse SubsetSessionId from Subset MetatData TargetSessionPairs
    Parse Subset SequenceNumber N from Subset MetaData
    WITH TargetSession, WHERE Id = SubsetSessionId
    If MetaData SubsetStatus[N] = NOT_RECD
        MetaData SubsetStatus[N] = RECD
        Save Subset in SubsetBuffer[ ] at index =N
        Queue a ServerMsg - Session Id,Subset Sequence Number N
        Received
        If all Subsets received
            Check integrity of received DataSet
            If DataSet OK
                Process DataSet
                If Process Ok
                    Queue a ServerMsg Session Id SUCCESS
                Else
                    Queue a ServerMsg Session Id FAILED
                EndIf
            Else
                Queue a ServerMsg Session Id FAILED
            EndIf
            Delete All TargetSession related data
        EndIf
    Else
        Delete Subset
    EndIf
    EndWith TargetSession
END
```

Discussion:

Parse the SessionID for this Subset from SubSet Metatdata by parsing the Subset MetaData TargetSessionPair (1901). Recall that in order to conserve resources when sending the Subset the Device has removed all TargetSessionPairs from the MetaData except for the one corresponding to This Target.

Parse Subset SequenceNumber N from Subset MetaData (1902). Subsets can arrive in any order and may already have been received, the logic needs to handle all cases.

The SessionID is used to retrieve the TargetSession with the same ID and that TargetSession is used for the remainder of the procedure (1903).

If Subset N has been received then simply discard the Subset and exit the AssembleDataSet procedure (1904,1905)

Else Update the TargetSession MetaData SubsetStatus[N] To RECD (1906) and Save the Subset in TargetSession SubsetBuffer at location [N] (1907). In this example, The SubsetStatus array is a bitfield. If a bit is set True in array element N it means the Subset has been Received (RECD) else it has not. The SubsetBuffer is any Array of SubsetData and SubsetData is an array of bytes, size=MAX_SUBSET_SIZE, a system wide constant.

We notify the Server that we have received this Subset by queueing a ServerMsg to The ServerMsgBuffer with The SessionID and the SubsetSequenceNumber which will uniquely identify this Subset (1908).

We check whether or not all Subset have been received (1909). We do this by first checking that the Control Subset has been received SubsetStatus[0]=RECD. If it has then we know DataSetSubsetCount and the DataSetSignature. We then check that all the next SesssionSubsetCount elements of the SubsetStatus array are=RECD.

If all Subsets were received then we check Integrity of entire DataSet using the DataSetSignature in TargetSession MetaData (1911).

If the DataSet is valid then process DataSet (1913) and queue a ServerMsg indicating Success (1915) or Failure (1916). Else Queue a ServerMsg indicating Session Failed—Invalid Data (1916)

Delete all data for this Session (1917)

The following data structures may be used to implement the preceding embodiment. This is one example and other possibilities will occur to those skilled in the art.

Global Data Structures

```
struct Subset
{
    ID ID;
    SubsetMetaData MetaData;
    byte Data[ ];
};
struct SubsetMetaData
{
    SubsetType_t Type;
    long Size;
    long SequenceNumber;
    TargetSessionPair TargetSessionPairs[ ];
};
struct TargetSesssionPair
{
    ID TargetID;
    ID SessionID;
};
struct ServerMsg
{
    ID Source;
    MsgType_t Type;
    byte Data[ ];
};
enum MsgType_t
{
    SESSION_STATUS,
    SUBSET_RECD,
    INITIATE_SESSION,
    DEVICE_MSG
};
```

Server Data Structures

```
struct DataSetTransfer
{
    ID Id;
    Boolean Active;
    byte DataSet[ ];
    Session SessionList[ ];
    Target TargetList[ ];
    Subset SubsetList[ ];
    Device DeviceList[ ];
    int CostVsTime;
    time DeliveryTime;
    time TimeWindow;
};
```

```
struct Session
{
    ID ID;
    ID TargetID;
    SessionStatus_t Status;
    Device DeviceList[ ];
    ID TransferID;
    SubsetStatus_t SubsetStatusList[ ];
};
struct Device
{
    ID ID;
    Subset Queue[ ];
    String Name;
};
Device AllDevicesList[ ];
struct DeviceScore
{
    ID DeviceID;
    int Score;
};
DeviceScore DeviceScoreList[ ];
struct Target
{
    ID ID;
    String Name;
};
Target AllTargetsList[ ];
enum SessionStatus_t
{
    NOT_STARTED,
    IN_PROCESS,
    SUCCESS,
    FAILED
};
struct SubsetStatus
{
    int QueueCount;
    SubsetStatus_t Status
    ID SubsetID
}
enum SubsetStatus_t
{
    ERROR,
    NOT_QUEUED,
    QUEUED,
    RECEIVED
};
enum SubsetType_t
{
    CONTROL,
    TARGET_DATA,
    DEVICE
};
```

Device Data Structures

```
ServerMsg Server_MsgBuffer[ ];
Subset TargetBuffer[ ];
```

Target Data Structures

```
SerrvrMsg ServerMsgBuffer[ ];
TargetSession TargetSessionList[ ];
struct TargetSession
{
    TSessionMetaData MetaData;
    SubsetBuf SubsetBuffer[ ];
};
struct SubsetBuf
{
    byte Buf[MAX_SIZE_OF_SUBSET];
};
```

```
struct TSessionMetaData
{
    ID ID;
    long DataSetSignature;
    long SubsetSize;
    long CountSubSetsRecd;
    long TotalNumSubsets;
    BitField SubsetStatus[ ];
};
```

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A method of transferring data to a device, the method comprising:
   preparing a data set for a remote device;
   dividing the data set into subsets based on one or more criteria;
   automatically wirelessly delivering the different data subsets from a server to different smart devices based on rules;
   each said smart device, when proximate the remote device, automatically wirelessly transmitting its data subset to the remote device; and
   the remote device assembles the data subsets and sends a message to the smart device, the smart device transmits said message to the server, and the server acts on said message to change one of said rules.

2. The method of claim 1 in which the data set is a software update applied by the remote device.

3. The method of claim 1 in which the remote device is a locking device.

4. The method of claim 1 in which one of said rules includes wirelessly delivering one of said data subsets to two or more smart devices for redundancy.

5. The method of claim 1 in which one criteria includes the upload time required to wirelessly deliver a subset from the smart device to the remote device and the size of the data subset.

6. The method of claim 5 in which the upload time is based on the average time a smart device is proximate the remote device.

7. The method of claim 1 in which each smart device communicates with the remote device wirelessly via a Bluetooth connection.

8. The method of claim 1 in which one criteria is based on tracking when a smart device is proximate the remote device.

9. The method of claim 1 in which the smart devices receive their data subsets when networked with the server and transmit their data subsets to the remote device when not networked with the server.

10. The method of claim 1 in which the data subsets are encrypted by the server.

11. A method of indirectly transferring a data set to a remote device, the method comprising:
    preparing a data set for a remote device;
    dividing the data set into dynamic subsets;
    assigning each subset to one or more device queues for wireless delivery from a server to different smart devices configured to wirelessly communicate with the remote device when proximate the remote device;
    each said smart device, when proximate the remote device, automatically wirelessly transmitting a data subset to the remote device;
    the remote device confirming to the server the receipt of the data subset;
    the server, upon receiving said confirmation, dynamically removing said data subset from all device queues if still present in said queue; and
    the remote device assembling received data subsets into the data set regardless of the order in which the data subsets were received and disregarding subsets which were delivered redundantly.

12. A system for transferring data to a device, the system comprising:
    a server configured to:
        prepare a data set for a remote device,
        divide the data set into subsets based on one or more criteria, and
        wirelessly deliver the different data subsets to different smart devices based on rules;
    each said smart device, when proximate the remote device, configured to automatically wirelessly transmit its data subset to the remote device; and
    the remote device configured to assemble the data subsets and to send a message to the smart device;
    the smart device transmits said message to the server and the server acts on said message to change one of said rules.

13. The system of claim 12 in which the data set is a software update applied by the remote device.

14. The system of claim 12 in which the remote device is a locking device.

15. The system of claim 12 in which one of said rules includes wirelessly delivering one of said data subsets to two or more smart devices for redundancy.

16. The system of claim 12 in which one criteria includes dividing the data set into subsets based on an upload time required to wirelessly deliver a subset from the smart device to the remote device and the size of the data subset.

17. The system of claim 16 in which the upload time is based on the average time a smart device is proximate the remote locking device.

18. The system of claim 12 in which each smart device communicates with the remote device wirelessly via a Bluetooth connection.

19. The system of claim 12 in which one criteria is based on tracking when a smart device is proximate the remote device.

20. The system of claim 12 in which the smart devices receive their data subsets when networked with the server and transmit their data subsets to the remote device when not networked with the server.

21. The system of claim 12 in which the data subsets are encrypted by the server.

* * * * *